(12) United States Patent
Ishizuka et al.

(10) Patent No.: US 6,613,814 B2
(45) Date of Patent: Sep. 2, 2003

(54) COLORING COMPOSITION, INK FOR INK JET, AND INK JET RECORDING METHOD

(75) Inventors: Takahiro Ishizuka, Minami-Ashigara (JP); Keizo Kimura, Minami-Ashigara (JP); Makoto Yamada, Minami-Ashigara (JP); Keiichi Adachi, Minami-Ashigara (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 09/740,798

(22) Filed: Dec. 21, 2000

(65) Prior Publication Data

US 2001/0020055 A1 Sep. 6, 2001

(30) Foreign Application Priority Data

Dec. 22, 1999 (JP) ............................. 11-365188

(51) Int. Cl.$^7$ ...................... C09D 11/10; C08K 5/3472; C08L 33/02; C08L 33/08; C08L 33/10

(52) U.S. Cl. ........................... 523/160; 524/91; 524/94; 524/106; 524/556

(58) Field of Search ................................ 523/160, 161; 106/31.43, 31.49; 524/87, 91, 94, 104, 105, 106, 190, 556

(56) References Cited

U.S. PATENT DOCUMENTS 5,508,421 A * 4/1996 Suzuki et al. ............. 548/262.4

(List continued on next page.)

FOREIGN PATENT DOCUMENTS

JP 56-157468 4/1981

(List continued on next page.)

*Primary Examiner*—Callie E Shosho
(74) *Attorney, Agent, or Firm*—Burns, Doane, Swecker & Mathis, LLP

(57) ABSTRACT

The present invention related to an ink for an ink jet comprising: a coloring composition containing coloring particulates dispersed in a water-based medium, the coloring particulates containing an oil-soluble polymer and an oil-soluble dye represented by at least one of following formulae (I), (II), (III), (IV), wherein $R^1$, $R^2$, $R^3$ and $R^4$ each represent a hydrogen atom or a non-metallic atomic group; X represents —OH or $NR^5R^6$; $R^5$ and $R^6$ each represent a hydrogen atom, an alkyl group, an aryl group or a heterocyclic group; $R^7$, $R^8$ and $R^9$ each represent a hydrogen atom or a non-metallic atomic group; at least one of $R^1$ and $R^2$, or $R^2$ and $R^5$, or $R^5$ and $R^6$, or $R^6$ and $R^3$, or $R^3$ and $R^4$ may form a ring structure; and $R^7$ and $R^8$ may bind together to form a ring structure

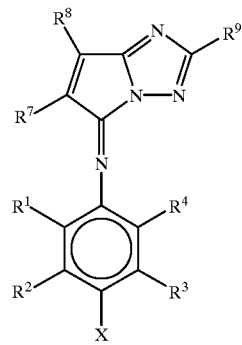
(I)

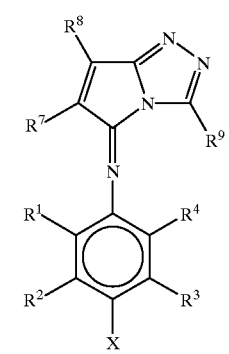

(II)

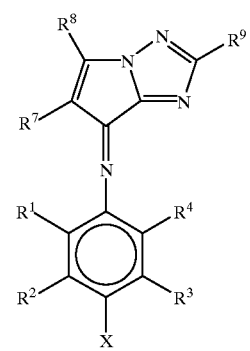

(III)

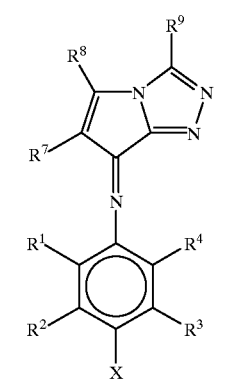

(IV)

18 Claims, No Drawings

U.S. PATENT DOCUMENTS

| | | | | |
|---|---|---|---|---|
| 5,753,017 A | * | 5/1998 | Onodera et al. | 106/31.49 |
| 5,837,754 A | * | 11/1998 | Shimomura et al. | 523/161 |
| 6,025,412 A | * | 2/2000 | Sacripante et al. | 523/161 |
| 6,031,019 A | * | 2/2000 | Tsutsumi et al. | 523/160 |

FOREIGN PATENT DOCUMENTS

| | | |
|---|---|---|
| JP | 58-45272 | 3/1983 |
| JP | 4-18468 | 1/1992 |
| JP | 6-340835 | 12/1994 |
| JP | 7-268254 | 10/1995 |
| JP | 7-268257 | 10/1995 |
| JP | 7-268260 | 10/1995 |
| JP | 9-59552 | 3/1997 |
| JP | 9-111163 | 4/1997 |
| JP | 9-255887 | 9/1997 |
| JP | 10-36728 | 2/1998 |
| JP | 10-110126 | 4/1998 |
| JP | 10-195355 | 7/1998 |
| JP | 11140361 * | 5/1999 |

* cited by examiner

COLORING COMPOSITION, INK FOR INK JET, AND INK JET RECORDING METHOD

BACKGROUND OF THE INVENTION

1. Field of the Invention

The present invention relates to a water-based coloring composition containing an oil soluble dye, and to an ink for an ink jet which contains the coloring composition, and to an ink jet recording method using the ink for an ink jet. In particular, the present invention relates to a coloring composition whose color reproduction (especially cyan color reproduction) is good and which is suited for water based inks for writing, water based printing inks, inks for information recording, and the like, and to an ink for an ink jet which is suitable for a thermal, piezo-electric, electric field, or acoustic ink jet method, and to an ink jet recording method.

2. Description of the Related Art

In recent years, as use of computers has become more widespread, ink jet printers have become widely used not only in offices, but in homes as well, for printing on paper, film, cloth and the like. Oil based inks, water based inks, solid inks and the like are known as inks for ink jets. Among these, water based inks are advantageous from the standpoints of ease of production, usability, lack of odor, safety, and the like thereof, and therefore, water based inks are mainly used.

However, most water based inks use a water soluble dye which dissolves when in a molecular state. Thus, although there are great advantages with regard to transparency and color density, because the dye is water soluble, the water resistance thereof is poor. Problems arise in that when a water based ink is used for printing onto regular paper, bleeding occurs such that the quality of the printed product markedly deteriorates. Further, the light resistance is poor.

Water based inks using pigments or dispersed dyes in order to overcome these problems are proposed in, for example, Japanese Patent Application Laid-Open (JP-A) Nos. 56-157468, 4-18468, 10-110126, 10-195355 and the like.

However, with these water based inks, although the water resistance is improved to a certain extent, it is still insufficient. There are further problems in that the storage stability of the dispersion of the dispersed dye or pigment within the water based ink is lacking, and it is easy for clogging of the ink discharge ports to occur. Further, with these water based inks, generally, a sufficient hue cannot be obtained, and in particular, the hue of the cyan component is insufficient. Problems in color reproduction arise due to the insufficient color tone.

JP-A Nos. 58-45272, 6-340835, 7-268254, 7-268257, and 7-268260 disclose a method of encapsulating a dye in urethane or polyester dispersion particles.

However, in such cases, the color reproduction is insufficient due to the insufficient color tone. Further, the dispersion stability and water resistance of the dye encapsulating polymer substance, when a dye is encapsulated to a desired concentration, are not always sufficient.

JP-A Nos. 9-59552, 9-111163, 9-255887, and 10-36728 propose improving the color tone by using a colorant in which an aromatic diamine is coupled with a pyrazolotriazole.

However, in these cases, there are problems in that the color tone changes depending on the type of image receiving paper, and the water resistance is insufficient.

SUMMARY OF THE INVENTION

The present invention overcomes the above-described drawbacks, and achieves the following objects. The present invention provides a coloring composition which has excellent dispersion stability of the coloring particulates, has excellent color forming property and excellent color tone (especially cyan color reproduction) when printing onto any type of paper regardless of the paper type, has excellent water resistance and light resistance, and is suitable for use as a water based ink for writing, a water based printing ink, an ink for information recording, or the like. The present invention also provides an ink for an ink jet which is suited for a thermal, piezo-electric, electric field or acoustic ink jet method, which does not cause clogging of a nozzle tip when printing is carried out using nozzles, and which has excellent color forming property and excellent color tone (especially cyan color reproduction) when printing onto any type of paper regardless of paper type, and has excellent water resistance and light resistance, and to an ink jet recording method.

A first aspect of the present invention is an ink for an ink jet comprising: a coloring composition containing coloring particulates dispersed in a water-based medium, the coloring particulates containing an oil-soluble polymer and an oil-soluble dye represented by at least one of following formulae (I), (II), (III), (IV):

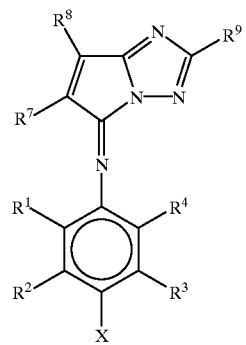

(I)

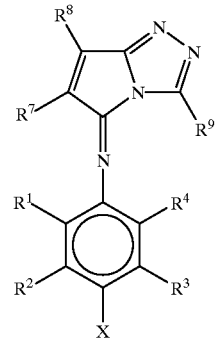

(II)

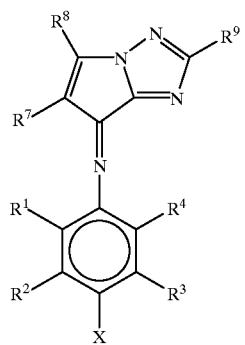
(III)

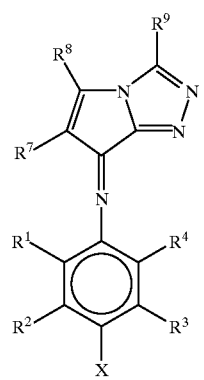
(IV)

formulae (I) through (IV)

wherein, in formulae (I), (II), (III) and (IV), $R^1$, $R^2$, $R^3$ and $R^4$ each represent a hydrogen atom or a non-metallic atomic group; X represents —OH or $NR^5R^6$; $R^5$ and $R^6$ each represent a hydrogen atom, an alkyl group, an aryl group or a heterocyclic group; $R^7$, $R^8$ and $R^9$ each represent a hydrogen atom or a non-metallic atomic group; at least one of $R^1$ and $R^2$, or $R^2$ and $R^5$, or $R^5$ and $R^6$, or $R^6$ and $R^3$, or $R^3$ and $R^4$ may form a ring structure; and $R^7$ and $R^8$ may bind together to form a ring structure.

A second aspect of the present invention is a coloring composition comprising: coloring particulates containing an oil-soluble polymer and an oil-soluble dye, the dye being represented by at least one of following formulae (I), (II), (III), (IV), seid coloring particulates being dispersed in a water-based medium:

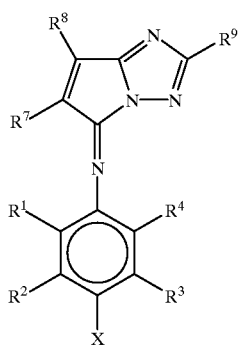
(I)

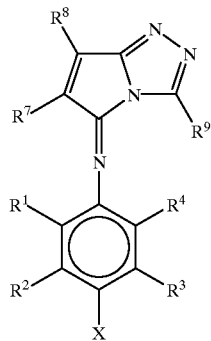
(II)

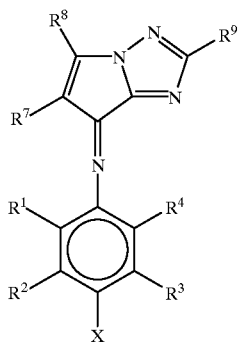
(III)

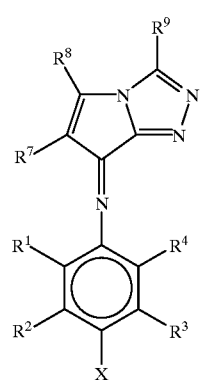
(IV)

formulae (I) through (IV)

wherein, in formulae (I), (II), (III) and (IV), $R^1$, $R^2$, $R^3$ and $R^4$ each represent a hydrogen atom or a non-metallic atomic group; X represents —OH or $NR^5R^6$; $R^5$ and $R^6$ each represent a hydrogen atom, an alkyl group, an aryl group or a heterocyclic group; $R^7$, $R^8$ and $R^9$ each represent a hydrogen atom or a non-metallic atomic group; at least one of $R^1$ and $R^2$, or $R^2$ and $R^5$, or $R^5$ and $R^6$, or $R^6$ and $R^3$, or $R^3$ and $R^4$ may form a ring structure; and $R^7$ and $R^8$ may bind together to form a ring structure.

A third aspect of the present invention is an ink jet recording method comprising the steps of: (a) preparing an ink for an ink jet, containing a coloring composition in which coloring particulates, containing an oil-soluble polymer and an oil-soluble dye represented by at least one of following formulae (I), (II), (III), (IV), are dispersed in a water-based medium:

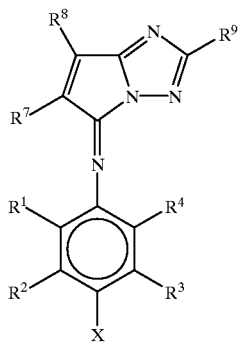
(I)

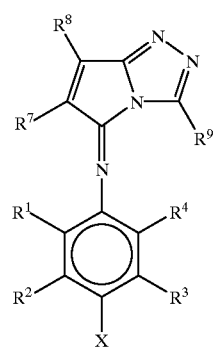
(II)

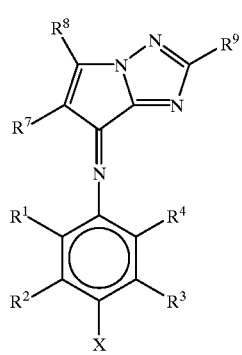
(III)

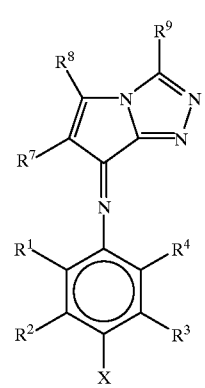
(IV)

formulae (I) through (IV)
wherein, in formulae (I), (II), (III) and (IV), $R^1$, $R^2$, $R^3$ and $R^4$ each represent a hydrogen atom or a non-metallic atomic group; X represents —OH or $NR^5R^6$; $R^5$ and $R^6$ each represent a hydrogen atom, an alkyl group, an aryl group or a heterocyclic group; $R^7$, $R^8$ and $R^9$ each represent a hydrogen atom or a non-metallic atomic group; at least one of $R^1$ and $R^2$, or $R^2$ and $R^5$, or $R^5$ and $R^6$, or $R^6$ and $R^3$, or $R^3$ and $R^4$ may form a ring structure; and $R^7$ and $R^8$ may bind together to form a ring structure; and (b) using the ink for recording in an ink-jet printing device.

DESCRIPTION OF THE PREFERRED EMBODIMENTS

The coloring composition, the ink for an ink jet, and the ink jet recording method of the present invention will be described hereinafter.

Coloring Composition

The wavelength of maximum absorption (λmax (nm)) of the coloring composition of the present invention must be within a wavelength range of 580 to 700 nm, and is preferably in the range of 590 to 690 nm, and is more preferably within the range of 600 to 650 nm.

When the wavelength of maximum absorption (λmax (nm)) falls within the above first-listed numerical range, the color reproduction is excellent. When the wavelength of maximum absorption (λmax (nm)) falls within the above preferable range or more preferable range, the color reproduction is markedly excellent.

When the absorbance at the wavelength of maximum absorption (λmax (nm)) of the coloring composition is 1, the absorbance at a wavelength 100 nm less than the wavelength of maximum absorption (λmax−100 (nm)) must be 0.35 or less, preferably 0.25 or less, and more preferably 0.15 or less.

When the light absorbancy at a wavelength of (λmax−100 (nm)) falls in the above first-listed numerical range, the color reproduction is excellent. When the light absorbancy falls within the above preferable or more preferable numerical ranges, the color reproduction is markedly excellent.

The coloring composition of the present invention is a dispersion, in a water based medium, of coloring particulates containing an oil soluble dye and an oil soluble polymer.

Oil Soluble Dye

The oil soluble dye is at least one type selected from the compounds (pyrrolotriazoleazomethine compounds) expressed by, for example, the following formulas (I), (II), (III) and (IV).

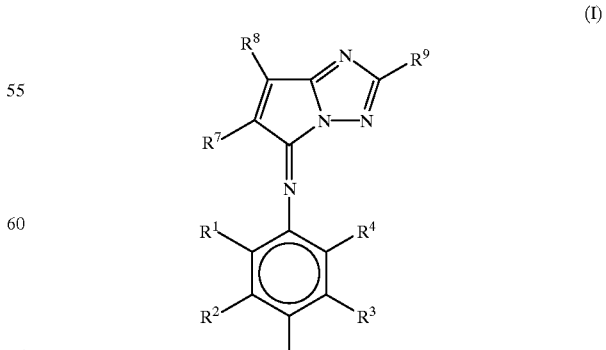
(I)

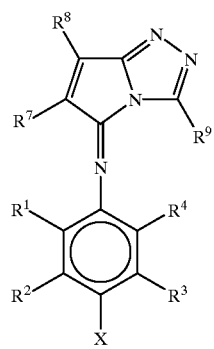

(II)

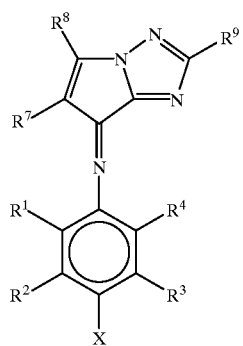

(III)

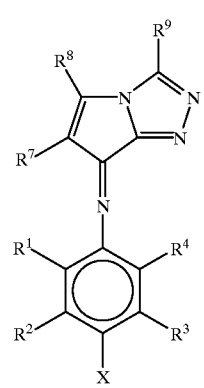

(IV)

$R^1$, $R^2$, $R^3$ and $R^4$ in the formulas (I), (II), (III) and (IV) each represent a hydrogen atom or a nonmetal atomic group.

Examples of the nonmetal atomic group are halogen atoms, an alkyl group, aryl group, heterocyclic group, cyano group, hydroxy group, nitro group, amino group (including substituted amino groups), alkoxy group, aryloxy group, acylamino group, aminocarbonylamino group, sulfamoylamino group, alkylthio group, arylthio group, alkoxycarbonylamino group, sulfonylamino group, carbamoyl group, sulfamoyl group, sulfonyl group, alkoxycarbonyl group, heterocyclic oxy group, azo group, acyloxy group, carbamoyloxy group, silyloxy group, aryloxycarbonyl group, imide group, heterocyclic thio group, sulfinyl group, phosphoryl group, acyl group, and the like.

Specific examples of the nonmetal atomic group are an alkyl group (preferably an alkyl group having from 1 to 20 carbon atoms such as methyl, ethyl, propyl, butyl), an alkoxy group (preferably an alkoxy group having from 1 to 20 carbon atoms such as methoxy, ethoxy, methoxyethoxy, isopropoxy), a halogen atom (for example, bromine, fluorine, chlorine), an acylamino group (preferably an alkylcarbonylamino group having from 1 to 20 carbon atoms (e.g., formylamino, acetylamino, propionylamino, cyanoacetylamino), preferably an arylcarbonylamino group having from 7 to 20 carbon atoms (e.g., benzoylamino, p-toluylamino, pentafluorobenzoylamino, m-methoxybenzoylamino)), an alkoxycarbonyl group (preferably having from 2 to 20 carbon atoms, e.g., methoxycarbonyl, ethoxycarbonyl), cyano group, sulfonylamino group (preferably having from 1 to 20 carbon atoms, e.g., methanesulfonylamino, ethanesulfonylamino, N-methylmethanesulfonylamino), a carbamoyl group (preferably an alkylcarbamoyl group having from 2 to 20 carbon atoms (e.g., methylcarbamoyl, ethylcarbamoyl, dimethylcarbamoyl, butylcarbamoyl, isopropylcarbamoyl, t-butylcarbamoyl, cyclopentylcarbamoyl, cyclohexylcarbamoyl, methoxyethylcarbamoyl, chloroethylcarbamoyl, cyanoethylcarbamoyl, ethylcyanoethylcarbamoyl, benzylcarbamoyl, ethoxycarbonylmethylcarbamoyl, furfurylcarbamoyl, tetrahydrofurfurylcarbamoyl, phenoxymethylcarbamoyl, arylcarbamoyl, crotylcarbamoyl, prenylcarbamoyl, 2,3-dimethyl-2-butenylcarbamoyl, homoallylcarbamoyl, homocrotylcarbamoyl, homoprenylcarbamoyl), preferably an arylcarbamoyl group having from 7 to 20 carbon atoms (e.g., phenylcarbamoyl, p-toluylcarbamoyl, m-methoxyphenylcarbamoyl, 4,5-dichlorophenylcarbamoyl, p-cyanophenylcarbamoyl, p-acetylaminophenylcarbamoyl, p-methoxycarbonylphenylcarbamoyl, m-trifluoromethylphenylcarbamoyl, o-fluorophenylcarbamoyl, 1-naphthylcarbamoyl), preferably a heterylcarbamoyl group having 4 to 20 carbon atoms (e.g., 2-pyridylcarbamoyl, 3-pyridylcarbamoyl, 4-pyridylcarbamoyl, 2-thiazolylcarbamoyl, 2-benzothiazolylcarbamoyl, 2-benzoimidazolylcarbamoyl, 2-(4-methylphenyl)1,3,4-thiadiazolylcarbamoyl)), a sulfamoyl group (preferably having from 0 to 20 carbon atoms, e.g., methylsulfamoyl, dimethylsulfamoyl), an aminocarbonylamino group (preferably having from 1 to 20 carbon atoms, e.g., methylaminocarbonylamino, dimethylaminocarbonylamino), an alkoxycarbonylamino group (preferably having from 2 to 20 carbon atoms, e.g., methoxycarbonylamino, ethoxycarbonylamino), a hydroxy group, an amino group (preferably having 0 to 20 carbon atoms, e.g., amino, methylamino, dimethylamino, anilino), an aryl group (preferably having from 6 to 20 carbon atoms, e.g., phenyl, m-acetylphenyl, p-methoxyphenyl), a heterocyclic group (preferably having from 3 to 20 carbon atoms, e.g., 2-pyridyl, 2-furyl, 2-tetrahydrofuryl), a nitro group, an aryloxy group (preferably having from 6 to 20 carbon atoms, e.g., phenoxy, p-methoxyphenoxy, o-chlorophenoxy), a sulfamoylamino group (preferably having from 0 to 20 carbon atoms, e.g., methylsulfamoylamino, dimethylsulfamoylamino), an alkylthio group (preferably having 1 to 20 carbon atoms, e.g., methylthio, ethylthio), an arylthio group (preferably having from 6 to 20 carbon atoms, e.g., phenylthio, p-methoxyphenylthio, o-chlorophenylthio), a sulfonyl group (preferably having from 1 to 20 carbon atoms, e.g., methanesulfonyl, p-toluenesulfonyl), an acyl group (preferably having from 1 to 20 carbon atoms, e.g., formyl, acetyl, benzoyl, p-toluyl), a heterocyclic oxy group (preferably having from 3 to 20 carbon atoms), an azo group (preferably having from 3 to 20 carbon atoms, e.g., p-nitrophenylazo), an acyloxy group (preferably having from 1 to 20 carbon atoms, e.g., acetyloxy, benzoyloxy), a carbamoyloxy group (preferably having 1 to 20 carbon atoms, e.g., methylcarbamoyloxy), a silyloxy group (preferably having from 3 to 20 carbon atoms, e.g., trimethylsiloxy), an aryloxycarbonyl group (preferably having from 7 to 20 carbon atoms, e.g., phenoxycarbonyl), an imide group (preferably having from 4 to 20 carbon atoms, e.g., phthalimide), a heterocyclic thio group (preferably having from 3 to 20 carbon atoms), a sulphinyl group (preferably having from 1 to 20 carbon atoms, e.g., diethylaminosulphinyl), a phosphoryl group (preferably having from 0 to 20 carbon atoms, e.g., diaminophosphoryl), and the like.

$R^1$ is preferably a hydrogen atom, an alkyl group having from 1 to 20 carbon atoms, an alkoxy group having from 1 to 20 carbon atoms, a halogen atom (fluorine, chlorine, bromine), an acylamino group having from 1 to 20 carbon atoms, a sulfonylamino group having from 1 to 20 carbon atoms, an aminocarbonylamino group having from 1 to 20 carbon atoms, an alkoxycarbonylamino group having from 2 to 20 carbon atoms, and is more preferably a hydrogen atom, an alkyl group, or an acylamino group.

$R^2$, $R^3$ and $R^4$ are preferably a hydrogen atom.

In the formulas (I), (II), (III), and (IV), X represents —OH or —$NR^5R^6$, and is preferably —$NR^5R^6$.

$R^5$ and $R^6$ each represent a hydrogen atom, an alkyl group (preferably having 1 to 20 carbon atoms, e.g., methyl, ethyl, propyl, isopropyl, butyl, 2-methoxyethyl, 3-methoxypropyl, ethoxyethyl, 2-phenylethyl, 2-cyanoethyl, cyanomethyl, 2-methylsulfonylaminoethyl, 2-chloroethyl, 3-bromopropyl, 2-methoxycarbonylethyl, 3-ethoxycarbonylpropyl, 2-(N-methylaminocarbonyl)ethyl, 3-(N,N-dimethylaminocarbonyl)propyl, 2-acetylaminoethyl, 3-(ethylcarbonylamino)propyl, 2-acetyloxyethyl, allyl, homoallyl, prehnyl, n-dodecyl, 2-hydroxyethyl, 2,3-dihydroxypropyl, 3,4-dihydroxybutyl, 2,3,4,5,6-pentahydroxyhexyl, 2-(2-hydroxyethoxy)ethyl, 2-[2-(2-hydroxyethoxy)ethoxy]ethyl, 2-(2-[2-(2-hydroxyethoxy)ethoxy]ethoxy)ethyl, carboxymethyl, 2-carboxyethyl), an aryl group (preferably having 6 to 20 carbon atoms, e.g., phenyl, p-tolyl, p-methoxyphenyl, 2,4-dichlorophenyl, p-nitrophenyl, 2,4-dicyanophenyl, 2-napthyl), or a heterocyclic group (including heterocyclic groups having a substituent, and preferably a heterocyclic group having 3 to 20 carbon atoms, such as the groups represented by the following).

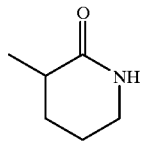

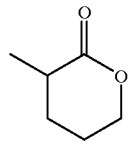

$R^5$ and $R^6$ are each preferably an alkyl group having from 1 to 20 carbon atoms and which may be substituted (e.g., methyl, ethyl, propyl, isopropyl, butyl, 2-cyanoethyl, cyanomethyl, 2-(N-methylaminocarbonyl)ethyl, 2-acetylaminoethyl, 2-acetyloxyethyl, allyl, n-dodecyl, 2-hydroxyethyl, 2,3-dihydroxypropyl, 2,3,4,5,6-pentahydroxyhexyl, 2-(2-hydroxyethoxy)ethyl, 2-carboxyethyl, 2-methylsulfonylaminoethyl).

In formulas (I), (II), (III) and (IV), $R^7$, $R^8$ and $R^9$ each represent a hydrogen atom or a nonmetal atomic group.

Examples of the nonmetal atomic group include an aryl group, heterocyclic group, alkyl group, cyano group, acyl group, carbamoyl group, alkoxycarbonyl group, aryloxycarbonyl group, acylamino group, alkoxycarbonylamino group, aryloxycarbonylamino group, sulfonylamino group, aminocarbonylamino group, sufamoylamino group, amino group (including anilino group), alkoxy group, aryloxy group, silyloxy group, heteryloxy group, alkylthio group, arylthio group, heterylthio group, halogen atom, hydroxy group, nitro group, sulfamoyl group, sulfonyl group, azo group, acyloxy group, carbamoyloxy group, imido group, sulfinyl group, phosphoryl group, and the like.

Specific examples of the nonmetal atomic group include aryl group (preferably having 6 to 36 carbon atoms, e.g., phenyl, 4-t-butylphenyl, 2,4-di-amylphenyl, 2,4,6-trimethylphenyl, 2-tetradecanamidephenyl, 2-methoxyphenyl), alkyl group (preferably having 1 to 36 carbon atoms, e.g., methyl, ethyl, propyl, isopropyl, butyl, sec-butyl, t-butyl, tridecyl, t-amyl, t-octyl, 2-methanesulfonylethyl3-(3-pentadecylphenoxy)propyl, cyclohexyl, 3-(2,4-di-t-amylphenoxypropyl), cyano group, acyl group (preferably having 1 to 36 carbon atoms, e.g., acetyl, benzoyl), carbamoyl group (preferably having 1 to 36 carbon atoms, e.g., N,N-dibutylcarbamoyl), alkoxycarbonyl group (preferably having 1 to 36 carbon atoms, e.g., methoxycarbonyl, ethoxycarbonyl, isopropoxycarbonyl, 2,6-di-t-butyl-4-methylcyclohexyloxycarbonyl), aryloxycarbonyl group (preferably having 7 to 36 carbon atoms, e.g., phenoxycarbonyl, p-methoxyphenoxycarbonyl, m-chlorophenoxycarbonyl, o-methoxyphenoxycarbonyl), acylamino group (preferably an alkylcarbonylamino group having 1 to 36 carbon atoms (e.g., formylamino, acetylamino, propionylamino, cyanoacetylamino), preferably an arylcarbonylamino group having 7 to 36 carbon atoms (e.g., benzoylamino, p-toluylamino, pentafluorobenzoylamino, m-methoxybenzoylamino), preferably a heterylcarbonylamino group having 4 to 36 carbon atoms (e.g., 2-pyrydylcarbonylamino, 3-pyrydylcarbonylamino, furoylamino)), an alkoxycarbonyl amino group (preferably having 2 through 36 carbon atoms, e.g., methoxycarbonylamino, ethoxycarbonylamino, methoxyethoxycarbonylamino), aryloxycarbonylamino group (preferably having 7 to 36 carbon atoms, e.g., phenoxycarbonylamino, p-methoxyphenoxycarbonylamino, p-methylphenoxycarbonylamino, m-chlorophenoxycarbonylamino, o-chlorophenoxycarbonylamino), sulfonylamino group (preferably having 1 to 36 carbon atoms, e.g., methanesulfonylamino, benzenesulfonylamino, toluenesulfonylamino), aminocarbonylamino group (preferably having 1 to 36 carbon atoms, e.g., methylaminocarbonylamino, ethylaminocarbonylamino, anilinocarbonylamino, dimethylaminocarbonylamino), sulfamoylamino group (preferably having 1 to 36 carbon atoms, e.g., methylaminosulfonylamino, ethylaminosulfonylamino, anilinosulfonylamino), amino group (including anilino groups, preferably having 0 to 36 carbon atoms, e.g., amino, methylamino, dimethylamino, ethylamino, diethylamino, n-butylamino, anilino), alkoxy group (preferably having 1 to 36 carbon atoms, e.g., methoxy, ethoxy, isopropoxy, n-butoxy, methoxyethoxy, n-dodecyloxy), aryloxy group (preferably having 6 to 36 carbon atoms, e.g., phenoxy, m-chlorophenoxy, p-methoxyphenoxy, o-methoxyphenoxy, 4-t-butylphenoxy, 2,6-di-t-butylphenoxy), silyloxy group (preferably having 3 to 36 carbon atoms, e.g., trimethylsiloxy, t-butyldimethylsiloxy), heteryloxy group (preferably having 3 to 36 carbon atoms, e.g., tetrahydropyranyloxy, 3-pyridyloxy, 2-(1,3-benzoimidazolyl)oxy), alkylthio group (preferably having 1 to 36 carbon atoms, e.g., methylthio, ethylthio, n-butylthio, t-butylthio), arylthio group (preferably having 6 to 36 carbon atoms, e.g., phenylthio), heterylthio group (preferably having 3 to 36 carbon atoms, e.g., 2-pyridylthio, 2-(1,3-benzooxazolyl)thio, 1-hexadecyl-1,2,3,4-tetrazolyl-5-thio, 1-(3-N-octadecylcarbamoyl)phenyl-1,2,3,4-tetrazolyl-5-thio), heterocyclic group (preferably having 3 to 36 carbon atoms, e.g., 2-benzooxazolyl, 2-benzothiazolyl, 1-phenyl-2-benzoimidazolyl, 5-chloro-1-tetrazolyl, 1-pyrazolyl, 1-pyrolyl, 2-furanyl, 2-pyridyl, 3-pyridyl), a halogen atom (fluorine, chlorine, bromine), a hydroxy group, a nitro group, a sulfamoyl group (preferably having 0 to 36 carbon atoms, e.g., methylsulfamoyl, dimethylsulfamoyl), a sulfonyl group (preferably having 1 to 36 carbon atoms, e.g., methanesulfonyl, benzenesulfonyl, toluenesulfonyl), an azo group (preferably having 3 to 36 carbon atoms, e.g., p-nitrophenylazo), acyloxy group (preferably having 1 to 36 carbon atoms, e.g., formyloxy, acetyloxy, benzoyloxy), a carbamoyloxy group (preferably having 1 to 36 carbon atoms, e.g., methylcarbamoyloxy, diethylcarbamoyloxy), an imide group (preferably having 4 to 36 carbon atoms, e.g., succinic acid imide, phthalimide), a sulfinyl group (preferably having 1 to 36 carbon atoms, e.g., diethylaminosulfinyl), a phosphoryl group (preferably having 0 to 36 carbon atoms, e.g., diaminophosphoryl), and the like.

In formulas (I), (II), (III), and (IV), at least one of $R^1$ and $R^2$, $R^2$ and $R^5$, $R^5$ and $R^6$, $R^6$ and $R^3$, and $R^3$ and $R^4$, may together form a ring structure. $R^7$ and $R^8$ may bind together to form a ring structure.

Groups expressed as follows, for example, are suitable as the ring structure which may be formed by $R^5$ and $R^6$ binding together.

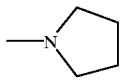 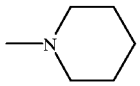 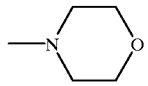

Groups expressed as follows, for example, are suitable as the ring structure which may be formed by $R^2$ and $R^5$, and/or $R^3$ and $R^6$ binding together.

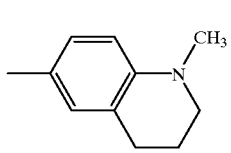 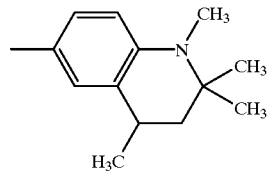

-continued

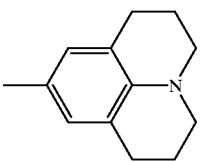 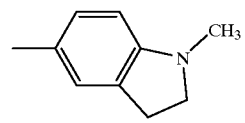

The oil-soluble dyes (pyrrolotriazoleazomethine compounds) represented by any of the formulas (I), (II), (III), (IV) can obtain various hues by various combinations of $R^1$, $R^2$, $R^3$, $R^4$, $R^5$, $R^6$, $R^7$, $R^8$ and $R^9$.

In the present invention, preferably, $R^7$ is an electron-attracting substituent, which is preferable as it has a sharper absorption waveform than that of a substituent which is not electron-attracting. The higher the degree of electron attraction thereof, the sharper the absorption waveform, which is more preferable. Specifically, rather than an alkyl group or an aryl group, $R^7$ is preferably an electron attracting group having a Hammett substituent constant $\sigma_p$ of 0.30 or more, and more preferably an electron attracting group having a Hammett substituent constant $\sigma_p$ of 0.45 or more, and particularly preferably an electron attracting group having a Hammett substituent constant $\sigma_p$ of 0.60 or more.

Specific examples include acyl group, acyloxy group, carbamoyl group, alkoxycarbonyl group, aryloxycarbonyl group, cyano group, nitro group, alkylsulfinyl group, arylsulfinyl group, alkylsulfonyl group, arylsulfonyl group, sulfamoyl group, halogenized alkyl groups, halogenized alkoxy groups, halogenized aryloxy groups, or halogenized alkylthio groups having a Hammett substituent constant $\sigma_p$ of 0.30 or more, or aryl groups substituted by two or more electron attracting groups having an $\sigma_p$ of 0.15 or more, or a heterocyclic group.

Among these specific examples, the following are preferable: acyl group (e.g., acetyl, 3-phenylpropanoyl), acyloxy group (e.g., acetoxy), carbamoyl group (e.g., N-ethylcarbamoyl, N,N-dibutylcarbamoyl, N-(2-dodecyloxyethyl)carbamoyl, N-methyl-N-dodecylcarbamoyl), alkoxycarbonyl group (e.g., methoxycarbonyl, butyloxycarbonyl, dodecyloxycarbonyl, octadecyloxycarbonyl), aryloxycarbonyl group (e.g., phenoxycarbonyl), cyano group, nitro group, alkylsulfinyl group (e.g., 3-phenoxypropylsulphinyl), arylsulfinyl group (e.g., 3-pentadecylphenylsulfinyl), alkylsulfonyl group (e.g., methanesulfonyl, octanesulfonyl), arylsulfonyl group (e.g., benzenesulfonyl), sulfamoyl group (e.g., N-ethylsulfamoyl, N,N-dipropylsulfamoyl), halogenized alkyl group (e.g., trifluoromethyl, heptafluoropropyl), halogenized alkoxy group (e.g., trifluoromethyloxy), halogenized aryloxy group (e.g., pentafluorophenyloxy), halogenized alkylthio group (e.g., difluoromethylthio), or two or more aryl groups which can be substituted by an electron attracting group having an $\sigma_p$ of 0.15 or more (e.g., 2,4-dinitrophenyl, 2,4,6-trichlorophenyl, pentachlorophenyl), or a heterocyclic group (e.g., 2-benzooxazolyl, 2-benzothiazolyl, 1-phenyl-2-benzoimidazolyl, 5-chloro-1-tetrazolyl, 1-pyrolyl).

Examples of electron attracting groups having a Hammett substituent constant $\sigma_p$ of 0.45 or more are acyl group (e.g., acetyl, 3-phenylpropanoyl), alkoxycarbonyl group (e.g., methoxycarbonyl), aryloxycarbonyl group (e.g., m-chlorophenoxycarbonyl), cyano group, nitro group, alkylsulfinyl group (e.g., n-propylsulfinyl), arylsulfinyl group (e.g., phenylsulfinyl), alkylsulfonyl group (e.g., methanesulfonyl, n-octanesulfonyl), arylsulfonyl group (e.g., benzenesulfonyl), sulfamoyl group (e.g., N-ethylsulfamoyl, N,N-dimethylsulfamoyl), halogenized alkyl group (e.g., trifluoromethyl), and the like.

Examples of electron attracting groups having a Hammett substituent constant $\sigma_p$ of 0.60 or more are cyano group (0.66), nitro group (0.78), methanesulfonyl group (0.72) and the like.

Here, the Hammett substituent constant will be described in further detail. Hammett's rule is an empirical rule proposed by L. P. Hammett in 1935 to quantitatively deal with the effect of substituents on a reaction or equilibrium of a benzene derivative. The appropriateness of Hammet's rule is widely recognized today. Substituent constants determined in accordance with Hammet's rule are the $\sigma_p$ value and the $\sigma_m$ value. Explanations of these values are given in many general publications, such as *Lange's Handbook of Chemistry* (J. A. Dean, ed.), Twelfth Edition, 1979 (McGraw-Hill) or *The Region of Chemistry* (*Kagaku no Ryoiki*), special edition, No. 122, pp. 96–103, 1979 (Nankodo).

In the present invention, the respective substituents are discussed with reference to their Hammett substituent constants $\sigma_p$, but this does not mean that the substituents of the present invention are limited to the substituents having values known in publications such as the aforementioned. The present invention also encompasses substituents whose values are not known from publications but can be measured in accordance with Hammett's rule. Hereinafter, $\sigma_p$ and $\sigma_m$ are used in the sense described above.

The hue of the oil-soluble dye (pyrrolotriazoleazomethine compound) represented by any of formulas (I), (II), (III) and (IV) is not particularly limited, but cyan is more preferable than magenta.

For the hue to be cyan, the sum of the Hammett substituent constant $\sigma_p$ values of $R^7$ and $R^8$ is preferably 0.70 or more, and more preferably 0.7 to 2.0. It is particularly preferable that the Hammett substituent constant $\sigma_p$ value of $R^8$ is 0.30 or more.

When the sum of the Hammett substituent constant $\sigma_p$ values of $R^7$ and $R^8$ is less than 0.70, the wavelength of maximum absorption is a short wavelength as a cyan hue, which is not preferable.

Suitable combinations which lead to the sum of the Hammett substituent constant $\sigma_p$ values of $R^7$ and $R^8$ being 0.70 or more are combinations in which $R^7$ is selected from cyano group, alkoxycarbonyl group, alkylsulfonyl group, arylsulfonyl group and halogenated alkyl group, and $R^8$ is selected from acyl group, acyloxy group, carbamoyl group, alkoxycarbonyl group, aryloxycarbonyl group, cyano group, alkylsulfonyl group, arylsulfonyl group, sulfamoyl group, and halogenated alkyl group.

The oil soluble dye (pyrrolotriazoleazomethine compound) expressed by either of formulas (I) or (II) can be used not only as a cyan dye, but also as a magenta dye.

In the present invention, among the oil soluble dyes (pyrrolotriazoleazomethine compounds) expressed by any of formulas (I), (II), (III) and (IV), the compound expressed by formula (I) is preferable. Among the compounds expressed by formula (I), compounds in which the following holds are preferable: $R^1$ is a hydrogen atom, an alkyl group having from 1 to 10 carbon atoms, an alkoxy group having from 1 to 10 carbon atoms, a halogen atom (fluorine, chlorine, bromine), an acylamino group having from 1 to 10 carbon atoms, an aminocarbonylamino group having from 1 to 10 carbon atoms, or an alkoxycarbonylamino group having from 1 to 10 carbon atoms; $R^2$, $R^3$ and $R^4$ all represent hydrogen atoms; X represents —$NR^5R^6$, and $R^5$ and $R^6$ each represent an alkyl group having 1 to 10 carbon atoms and which may be substituted; $R^7$ and $R^8$ each represent an electron attracting group whose Hammett substituent constant $\sigma_p$ value is 0.30 or more; and $R^9$ represents an alkyl group having from 1 to 20 carbon atoms or an aryl group having from 6 to 20 carbon atoms.

Among the compounds expressed by formula (I), compounds in which the following holds are particularly preferable: $R^1$ represents a hydrogen atom or a methyl group; $R^2$, $R^3$ and $R^4$ each represent a hydrogen atom; X represents —$NR^5R^6$; $R^5$ and $R^6$ each represent an alkyl group having from 1 to 5 carbon atoms; $R^7$ represents a cyano group; $R^8$ represents an alkoxycarbonyl group; and $R^9$ represents an aryl group.

Among these, when the oil soluble dye is used as a cyan dye, the sum of the Hammett substituent constant $\sigma_p$ values of $R^7$ and $R^8$ is preferably 0.70 or more, and more preferably 1.00 or more.

Specific examples (D-1 through 45) of the oil soluble dyes (pyrrolotriazoleazomethine compounds) represented by formulas (I), (II), (III) and (IV) are given hereinafter. However, it is to be understood that the present invention is not limited to these examples.

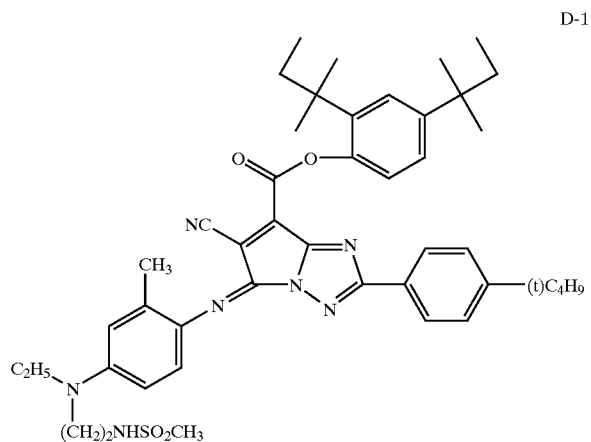

D-1

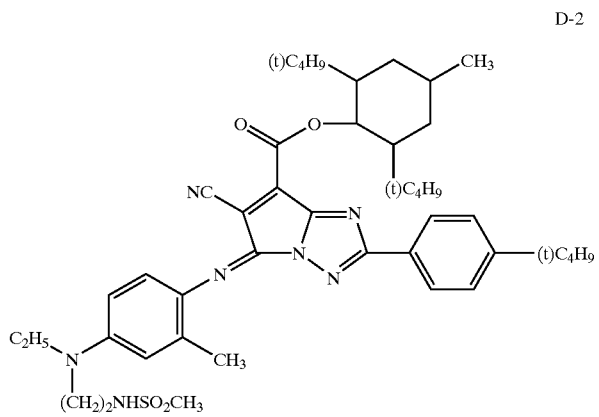

D-2

-continued
D-3
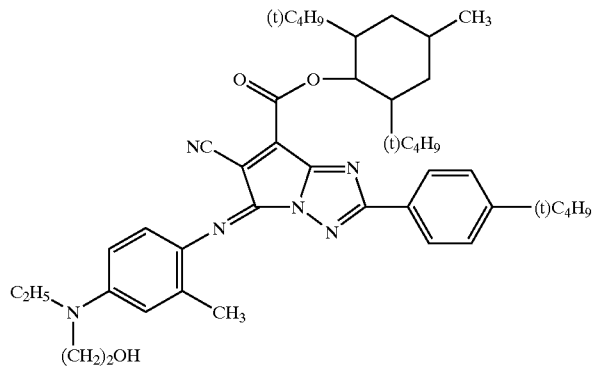
D-4
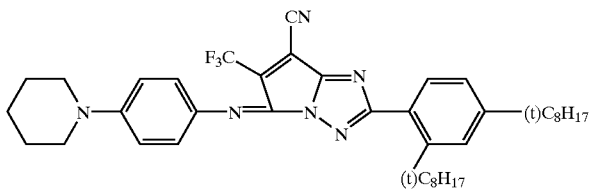
D-5
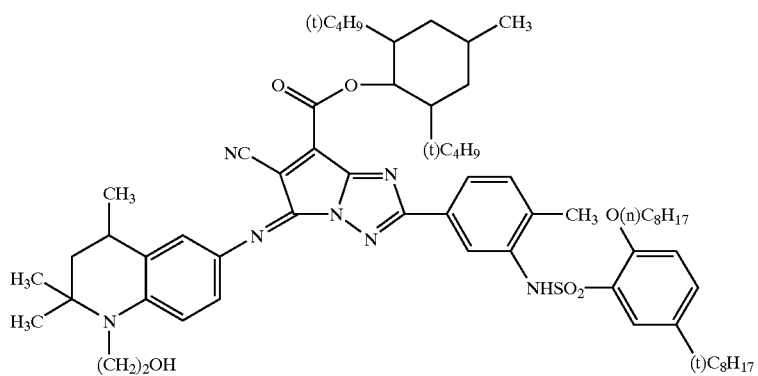
D-6
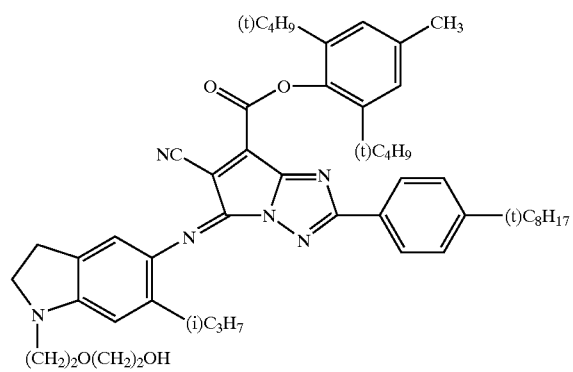
D-7
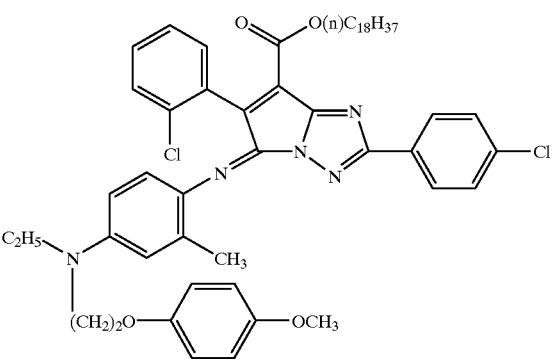
D-8
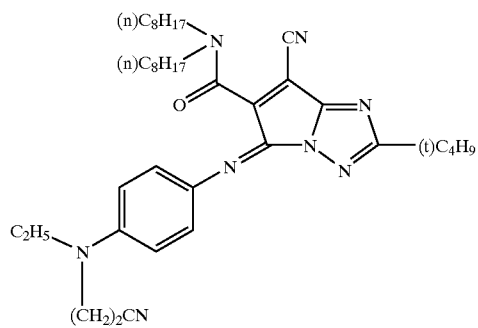
D-9
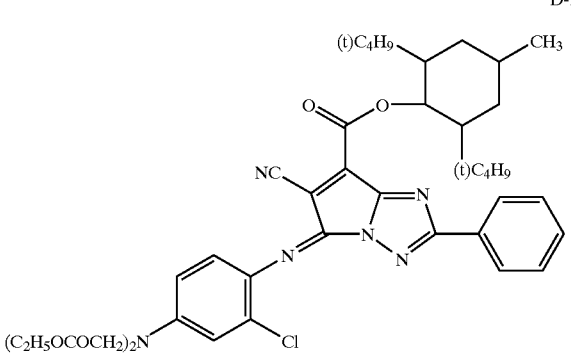

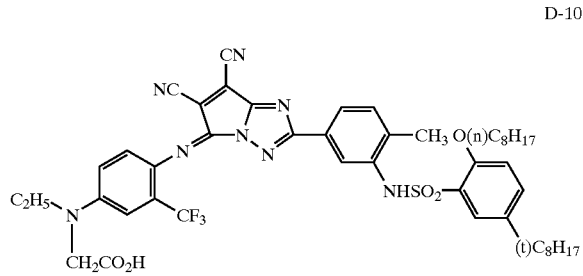
D-10
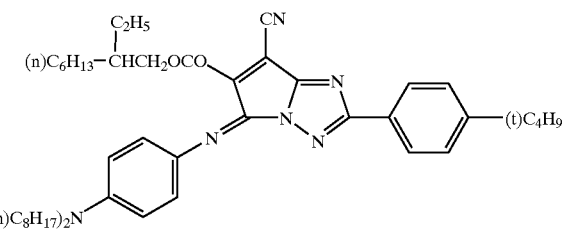
D-11
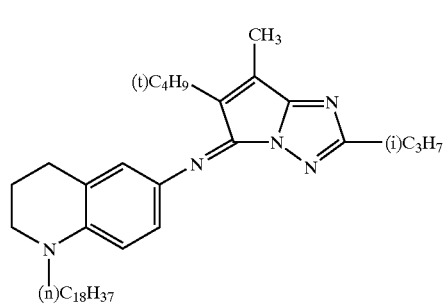
D-12
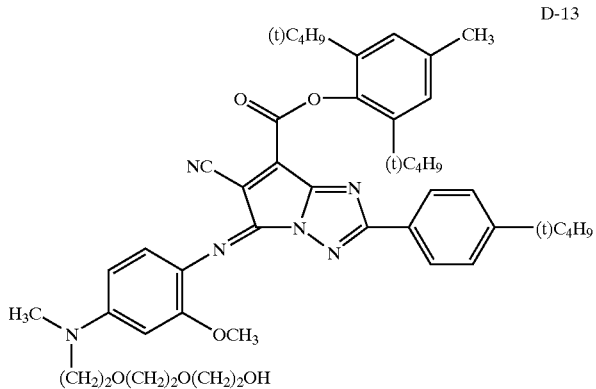
D-13
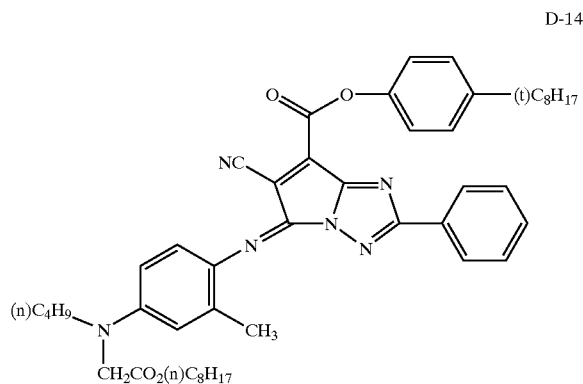
D-14
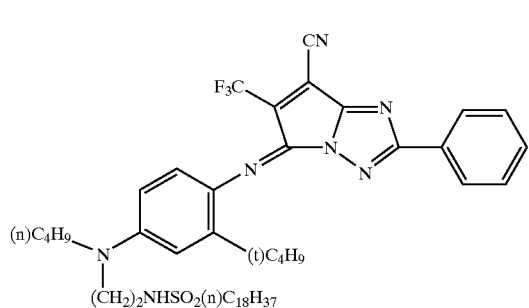
D-15
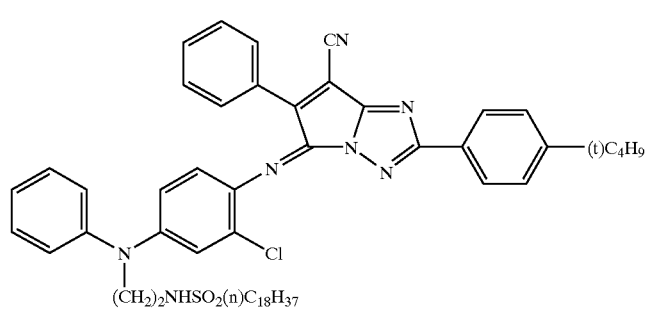
D-16

-continued
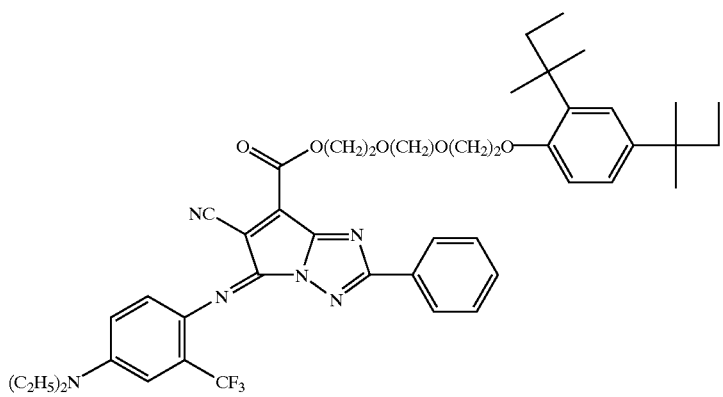
D-17
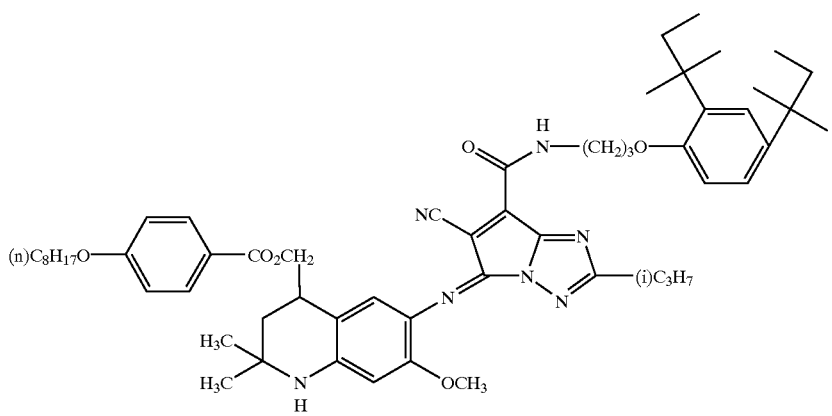
D-18
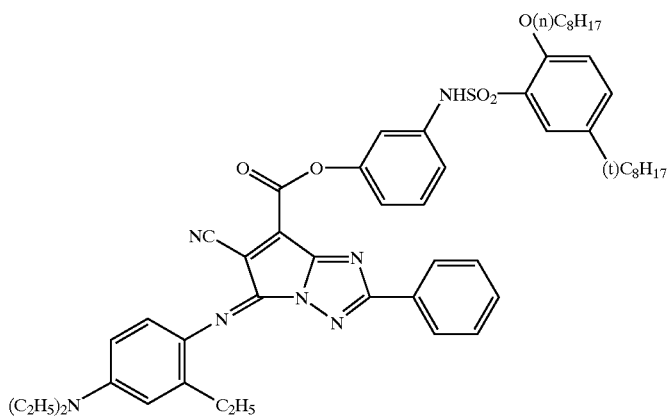
D-19
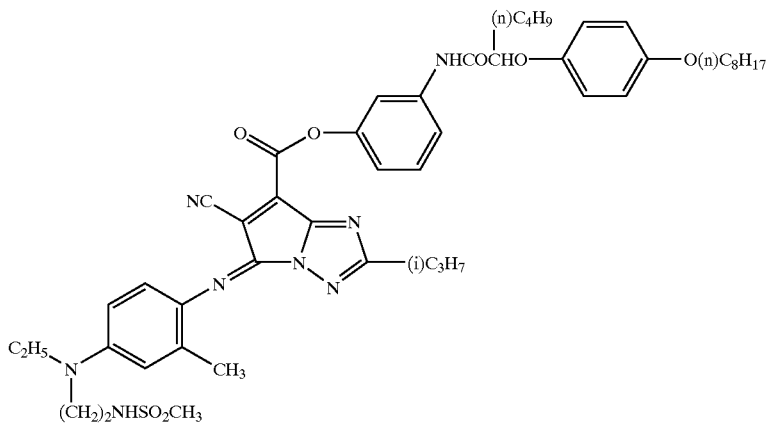
D-20

-continued
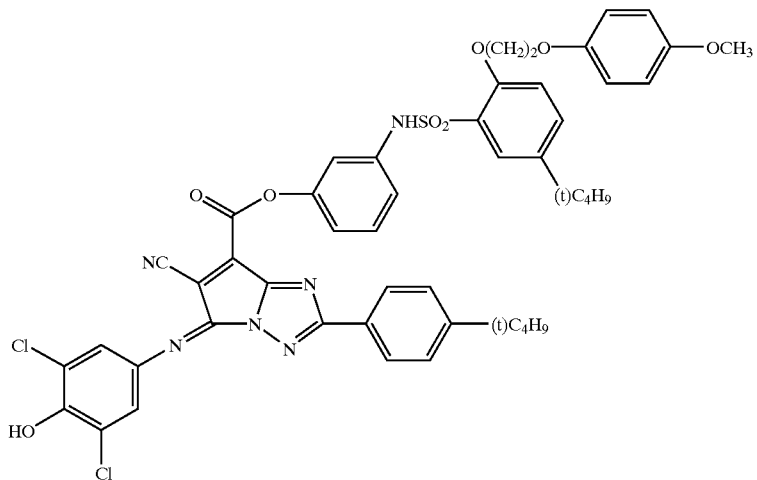
D-21
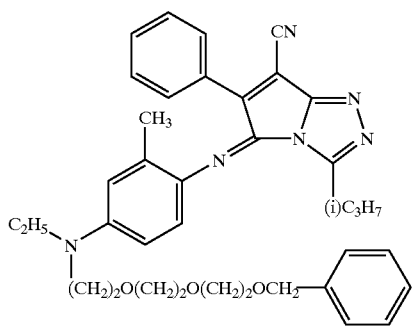
D-22
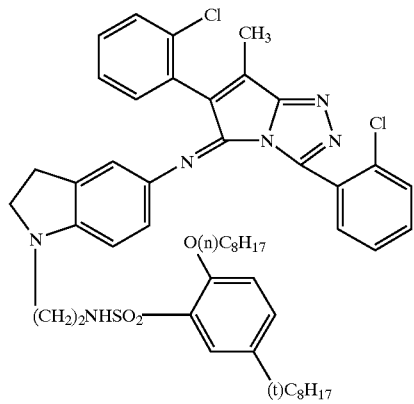
D-24
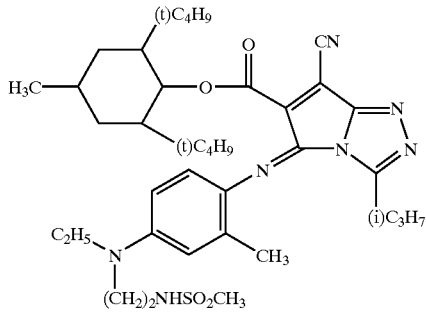
D-26
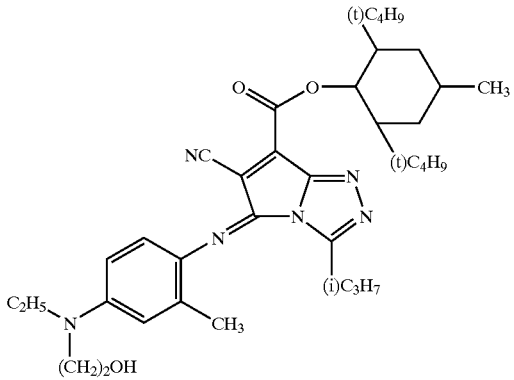
D-27

D-28
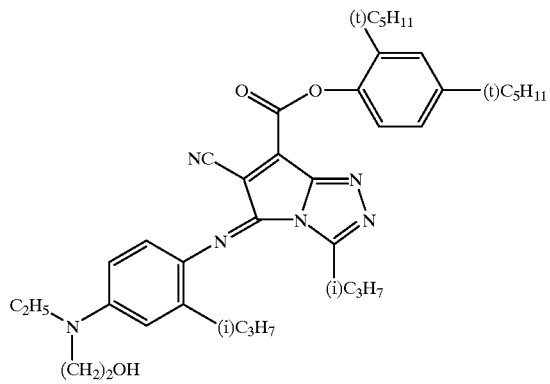
D-29
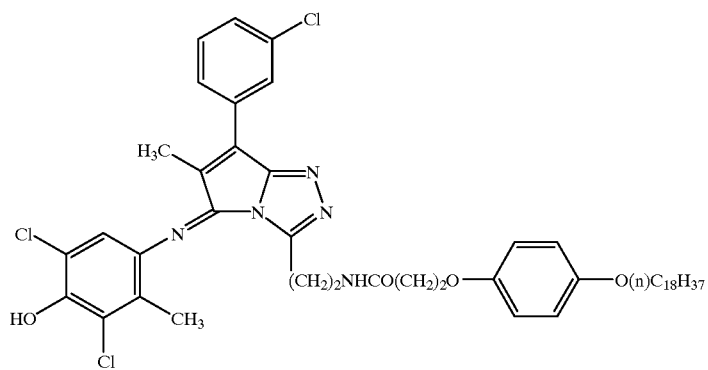
D-30
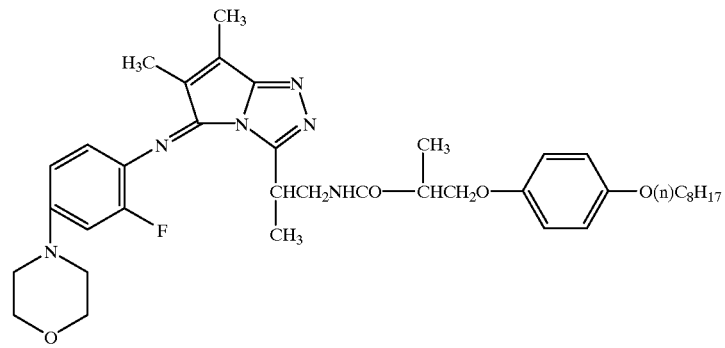
D-31
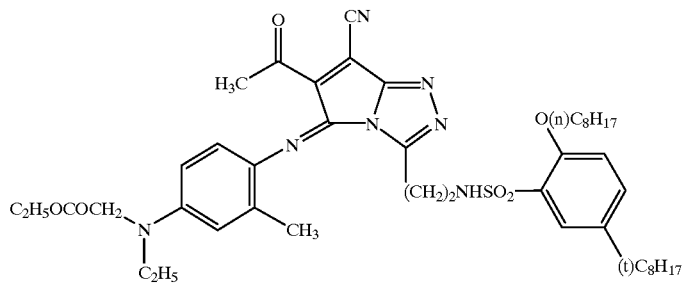

-continued
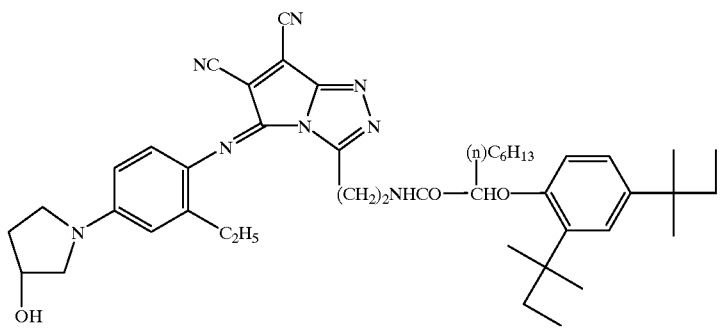
D-32
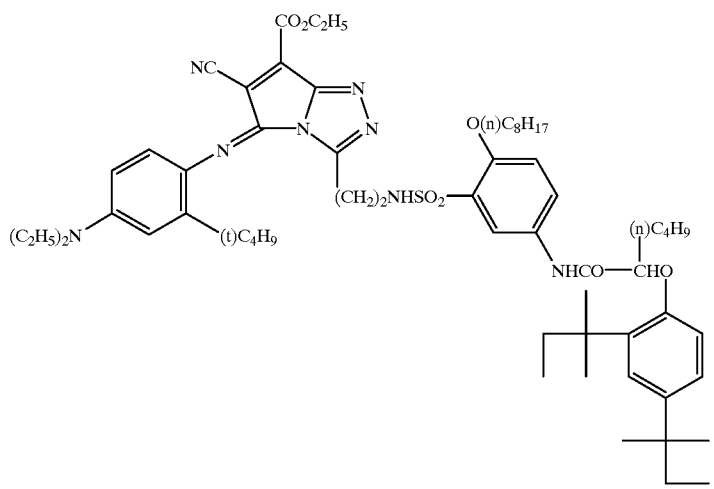
D-33
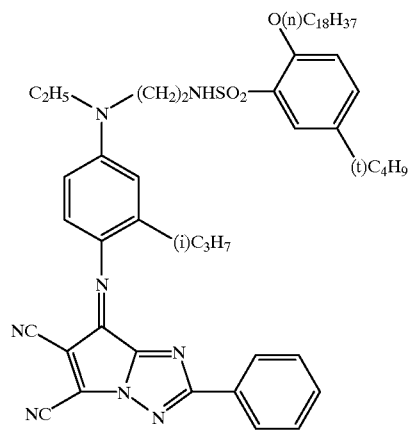
D-34
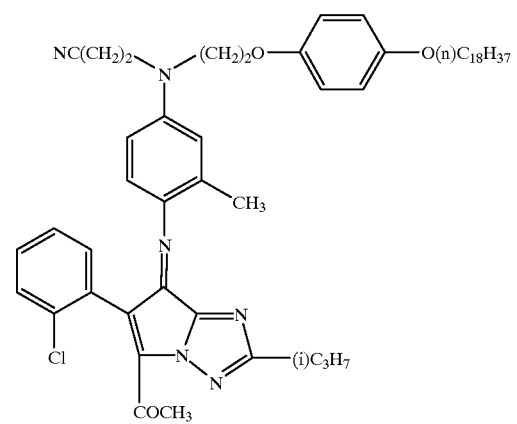
D-35

-continued
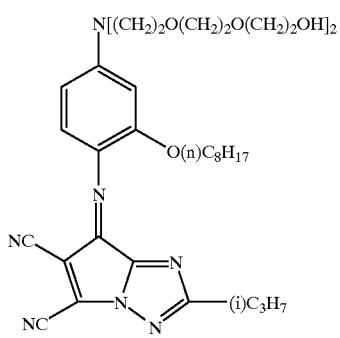
D-36
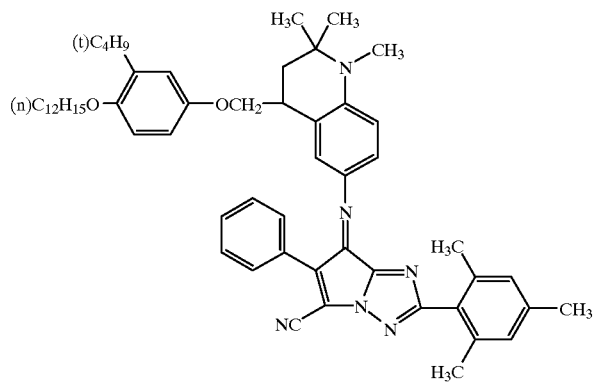
D-37
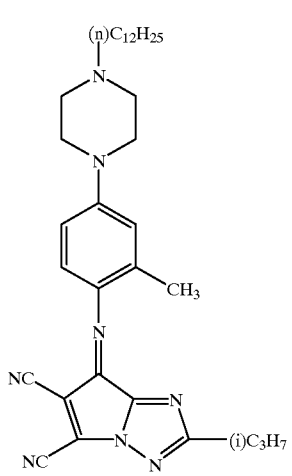
D-38
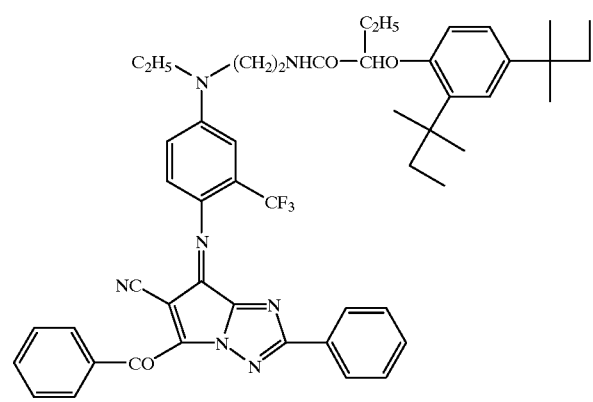
D-39
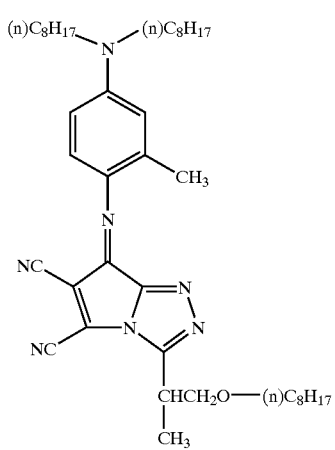
D-40
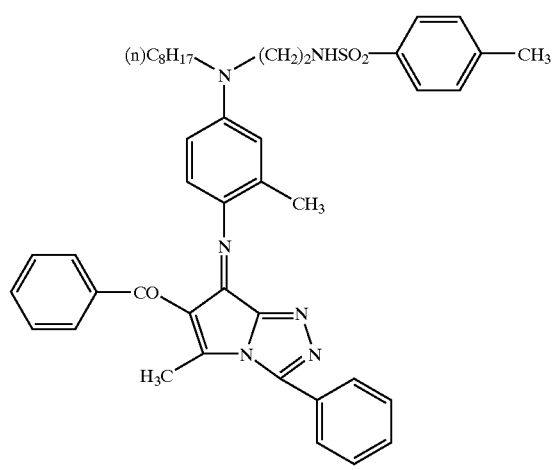
D-41

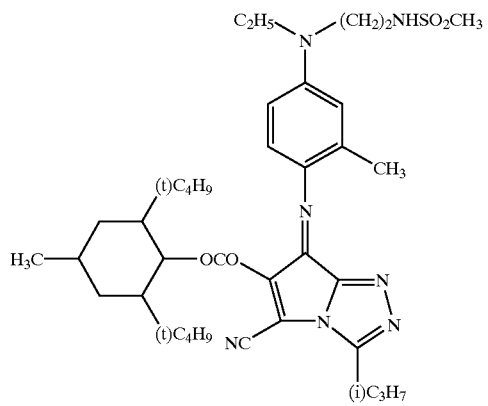

D-42

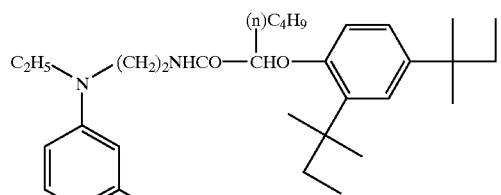

D-43

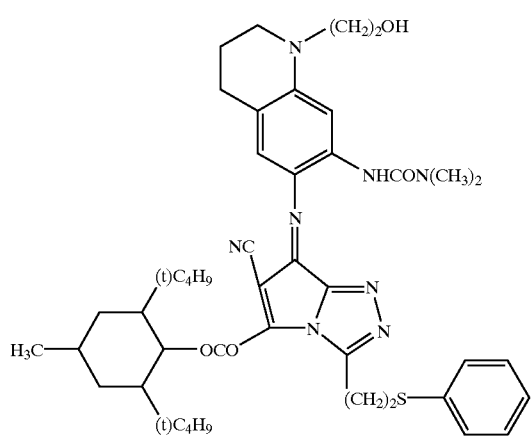

D-44

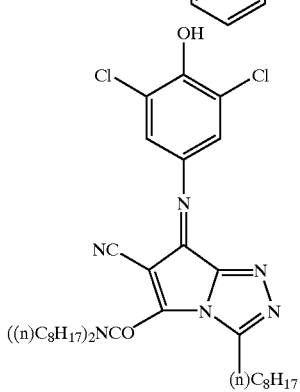

D-45

The oil soluble dyes (pyrrolotriazoleazomethine compounds) represented by each of (I), (II), (III), and (IV) are synthesized by oxide coupling the following couplers ((A), (B), (C) and (D)) with the following p-phenylenediamine compound (E).

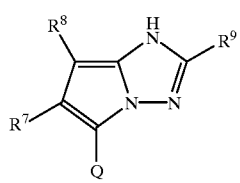

(A)

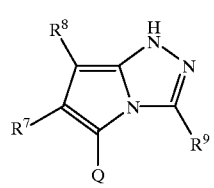

(B)

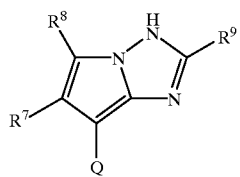

(C)

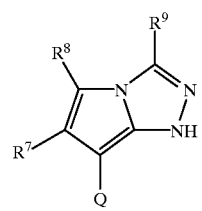

(D)

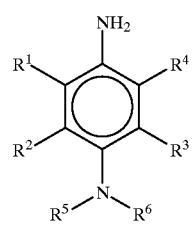

(E)

In this case, in the couplers ((A), (B), (C) and (D)), Q represents a hydrogen atom or a leaving group which leaves during the coupling reaction. The couplers ((A), (B), (C) and (D)) may be tautomers.

The oil soluble dyes (pyrrolotriazoleazomethine compounds) represented by the formulas (I), (II), (III) and (IV) are synthesized by, for example, dehydration polymerization of the following coupler ((A), (B), (C) and (D)) and the following nitroso compound (F).

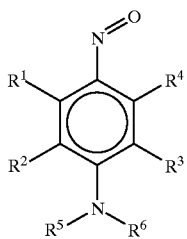

(F)

In this case, in the coupler ((A), (B), (C) and (D)), Q represents a hydrogen atom.

The oil soluble dyes (pyrrolotriazoleazomethine compounds) represented by the formulas (I), (II), (III) and (IV) may be synthesized with reference to the methods disclosed in JP-A Nos. 5-177959 and 9-292679.

Oil-Soluble Polymer

The oil-soluble polymer is not particularly limited, and may be selected appropriately in accordance with the object. Vinyl polymers are examples of suitable oil-soluble polymers.

Conventionally known vinyl polymers may be used. The vinyl polymer may be a water non-soluble type, a water dispersion (self-emulsifying) type, or a water soluble type, but is preferably a water dispersion type from the standpoints of ease of production, stability of dispersion and the like of the coloring particulates.

The water dispersion type vinyl polymer may be an ionic type, a non-ionic dispersion group containing type, or a mixed type of these types.

Examples of ionic type vinyl polymers are vinyl polymers containing a cationic group such as tertiary amino groups, or vinyl polymers containing an anionic group such as carboxylic acid, sulfonic acid or the like.

Examples of the non-ionic dispersion group containing type vinyl polymers are vinyl polymers containing a non-ionic dispersion group such as a polyethyleneoxy chain.

Among these, ionic type vinyl polymers having an anionic group, non-ionic dispersion group containing type vinyl polymers, and mixed type vinyl polymers are preferable from the standpoint of dispersion stability of the coloring particulates.

Examples of the monomers forming the vinyl polymer are the following:

acrylic esters, specifically, methyl acrylate, ethyl acrylate, n-propyl acrylate, isopropyl acrylate, n-butyl acrylate, isobutyl acrylate, sec-butyl acrylate, tert-butyl acrylate, amyl acrylate, hexyl acrylate, 2-ethylhexyl acrylate, octyl acrylate, tert-octyl acrylate, 2-chloroethyl acrylate, 2-bromoethyl acrylate, 4-chlorobutyl acrylate, cyanoethyl acrylate, 2-acetoxyethyl acrylate, benzyl acrylate, methoxybenzyl acrylate, 2-chlorocyclohexyl acrylate, cyclohexyl acrylate, furfuryl acrylate, tetrahydrofurfuryl acrylate, phenyl acrylate, 5-hydroxypentyl acrylate, 2,2-dimethyl-3-hydroxypropyl acrylate, 2-methoxyethyl acrylate, 3-methoxybutyl acrylate, 2-ethoxyethyl acrylate, 2-butoxyethyl acrylate, 2-(2-methoxyethoxy)ethyl acrylate, 2-(2-butoxyethoxy) ethyl acrylate, glycidyl acrylate, 1-bromo-2-methoxyethyl acrylate, 1,1-dichloro-2-ethoxyethylacrylate, 2,2,2-tetrafluoroethyl acrylate, 1H,1H,2H,2H-per-fluorodecyl acrylate, and the like;

methacrylic esters, specifically, methyl methacrylate, ethyl methacrylate, n-propylmethacrylate, isopropyl methacrylate, n-butyl methacrylate, isobutyl methacrylate, sec-butyl methacrylate, tert-butyl methacrylate, amyl methacrylate, hexyl methacrylate, cyclohexyl methacrylate, benzyl methacrylate, chlorobenzyl methacrylate, octyl methacrylate, stearyl methacrylate, 2-(3-phenylpropyloxy)ethyl methacrylate, furfuryl methacrylate, tetrahydrofurfuryl methacrylate, phenyl methacrylate, cresyl methacrylate, naphthyl methacrylate, 2-hydroxyethyl methacrylate, 4-hydroxybutyl methacrylate, triethylene glycol monomethacrylate, dipropylene glycol monomethacrylate, 2-methoxyethyl methacrylate, 3-methoxybutyl methacrylate, 2-ethoxyethyl methacrylate, 2-isopropoxyethyl methacrylate, 2-butoxyethyl methacrylate, 2-(2-methoxyethoxy)ethyl methacrylate, 2-(2-ethoxyethoxy)ethyl methacrylate, 2-(2-butoxyethoxy)ethyl methacrylate, 2-acetoxyethyl methacrylate, 2-acetoacetoxyethyl methacrylate, allyl methacrylate, glycidyl methacrylate, 2,2,2-tetrafluoroethyl methacrylate, 1H,1H,2H,2H-per-fluorodecylmethacrylate, and the like;

vinyl esters, specifically, vinyl acetate, vinyl propionate, vinyl butylate, vinyl isobutylate, vinyl caproate, vinyl chloroacetate, vinyl methoxyacetate, vinyl phenylacetate, vinyl benzoate, vinyl salicylate, and the like;

acrylamides, specifically, acrylamide, methylacrylamide, ethylacrylamide, propylacrylamide, butylacrylamide, tert-butylacrylamide, tert-octylacrylamide, cyclohexylacrylamide, benzylacrylamide, hydroxymethylacrylamide, methoxymethylacrylamide, butoxymethylacrylamide, methoxyethylacrylamide, phenylacrylamide, dimethylacrylamide, diethylacrylamide, β-cyanoethylacrylamide, N-(2-acetoacetoxyethyl)acrylamide, diacetoneacrylamide, and the like;

methacrylamides, specifically, methacrylamide, methyl methacrylamide, ethyl methacrylamide, propyl methacrylamide, butyl methacrylamide, tert-butyl methacrylamide, cyclohexyl methacrylamide, benzyl methacrylamide, hydroxymethyl methacrylamide, methoxyethyl methacrylamide, phenyl methacrylamide, dimethyl methacrylamide, β-cyanoethylmethacrylamide, N-(2-acetoacetoxyethyl) methacrylamide, and the like;

olefins, specifically, dicyclopentadiene, ethylene, propylene, 1-butene, 1-pentene, vinyl chloride, vinylidene chloride, isoprene, chloroprene, butadiene, 2,3-dimethylbutadiene, and the like; styrenes such as styrene, methylstyrene, dimethylstyrene, trimethylstyrene, ethylstyrene, isopropylstyrene, chloromethylstyrene, methoxystyrene, acetoxystyrene, chlorostyrene, dichlorostyrene, bromostyrene, and the like; and methyl vinylbenzoate;

vinyl ethers, specifically, methyl vinyl ether, butyl vinyl ether, hexyl vinyl ether, methoxyethyl vinyl ether and the like.

Examples of other monomers are butyl crotonate, hexyl crotonate, dimethyl itaconate, dibutyl itaconate, diethyl maleate, dimethyl maleate, dibutyl maleate, diethyl fumarate, dimethyl fumarate, dibutyl fumratate, methyl vinyl ketone, phenyl vinyl ketone, methoxyethyl vinyl ketone, N-vinyloxazolidone, N-vinylpyrrolidone, vinylidene chloride, methylenemalononitrile, vinylidene, diphenyl-2-acryloyloxyethyl phosphate, diphenyl-2-methacryloyloxyethyl phosphate, dibutyl-2-acryloyloxyethyl phosphate, dioctyl-2-methacryloyloxyethyl phosphate, and the like.

Examples of the monomer having an ionic group are monomers having an anionic group, and monomers having a cationic group.

Examples of the monomers having an anionic group are carboxylic acid monomers, sulfonic acid monomers, phosphoric acid monomers, and the like.

Examples of the carboxylic acid monomers are acrylic acid, methacrylic acid, itaconic acid, maleic acid, fumaric acid, citraconic acid, crotonic acid, itaconic acid monoalkylesters (e.g., monomethyl itaconic acid, monoethyl itaconic acid, monobutyl itaconic acid), maleic acid monoalkylesters (e.g., monomethyl maleate, monoethyl maleate, monobutyl maleate), and the like.

Examples of sulfonic acid monomers are styrene sulfonate, vinyl sulfonic acid, acryloyloxyalkanesulfonic acid (e.g., acryloyloxymethanesulfonic acid, acryloyloxyethanesulfonic acid, acryloyloxypropanesulfonic acid), methacryloyloxyalkanesulfonic acid (e.g., methacryloyloxymethanesulfonic acid, methacryloyloxyethanesulfonic acid, methacryloyloxypropanesulfonic acid), acrylamidealkanesulfonic acid (e.g., 2-acrylamide-2-methylethanesulfonic acid, 2-acrylamide-2-methylpropanesulfonic acid, 2-acrylamide-2-methylbutanesulfonic acid), methacrylamidealkanesulfonic acid (e.g., 2-methacrylamide-2-methylethanesulfonic acid, 2-methacrylamide-2-methylpropanesulfonic acid, 2-methacrylamide-2-methylbutanesulfonic acid), and the like.

Examples of phosphoric acid monomers are vinyl phosphonic acid, methacryloyloxyethylphosphonic acid, and the like.

Among these, acrylic acid, methacrylic acid, styrene sulfonic acid, vinyl sulfonic acid, acrylamide alkylsulfonic acid, methacrylamide alkylsulfonic acid are preferable, and acrylic acid, methacrylic acid, styrene sulfonic acid, 2-acrylamide-2-methylpropanesulfonic acid, and 2-acrylamide-2-methylbutanesulfonic acid are more preferable.

Examples of the monomer having a cationic group are monomers having a tertiary amino group such as dialkylaminoethyl methacrylate, dialkylaminoethyl acrylate and the like.

Examples of the monomer having a nonionic group are esters of polyethylene glycol monoalkyl ether and carboxylic acid monomers, esters of polyethylene glycol monoalkyl ether and sulfonic acid monomers, esters of polyethylene glycol monoalkyl ether and phosphoric acid monomers, vinyl-group-containing urethane formed from polyethylene glycol monoalkyl ether and an isocyanate-group-containing monomer, macromonomers containing a polyvinyl alcohol structure, and the like.

The number of times the ethyleneoxy portion of the polyethylene glycol monoalkyl ether is repeated is preferably 8 to 50, and more preferably 10 to 30. The number of carbon atoms of the alkyl group of the polyethylene glycol monoalkyl ether is preferably 1 to 20, and more preferably 1 to 12.

The vinyl polymer may be formed by using one type of these monomers, or the vinyl polymer may be formed by using two or more types of these monomers. The monomers used are appropriately selected in accordance with the object of the vinyl polymer (adjustment of Tg, improvement of solubility, dispersion stability, and the like).

In the present invention, among the aforementioned vinyl polymers, vinyl polymers having an ionic group are preferable, and those having at least one of a carboxyl group and a sulfonic acid group as the ionic group are more preferable, and those having a carboxyl group as the ionic group are particularly preferable.

The amount of the ionic group contained in the vinyl monomer is preferably 0.1 to 3.0 mmol/g, and more preferably 0.2 to 2.0 mmol/g. If the content of the ionic group is low, the self-emulsibility of the vinyl polymer is low, whereas if the content of the ionic group is high, the water solubility tends to increase which is unsuitable for dispersion of the dye.

Examples of anionic groups are salts of alkali metals (e.g., Na or K) or ammonium ion. Examples of cationic groups are salts of organic acids (e.g., acetic acid, propionic acid, methanesulfonic acid) or inorganic acids (hydrochloric acid, sulfuric acid, and the like).

Specific examples (P-1) through P-105)) of the vinyl polymers are given hereinafter. The ratios in the parentheses are mass ratios. However, it is to be noted that the present invention is not limited to these specific examples.

P-1) methylmethacrylate/ethylacrylate copolymer (50:50)
P-2) methylmethacrylate/methylacrylate copolymer (65:35)
P-3) butylacrylate/styrene copolymer (50:50)
P-4) polyethylmethacrylate
P-5) poly-n-butylmethacrylate
P-6) polyisobutylmethacrylate
P-7) polyisopropylmethacrylate
P-8) poly(2-chloroethylacrylate)
P-9) poly(2-tert-butylphenylacrylate)
P-10) poly(4-tert-butylphenylacrylate)
P-11) n-butylmethacrylate/N-vinyl-2-pyrrolidone copolymer (90:10)
P-12) methylmethacrylate/vinyl chloride copolymer (70:30)
P-13) methylmethacrylate/styrene copolymer (50:50)
P-14) isobutylmethacrylate/butylacrylate copolymer (55:45)
P-15) n-butylmethacrylate/methylmethacrylate/styrene copolymer (50:30:20)
P-16) vinyl acetate/acrylamide copolymer (85:15)
P-17) vinyl chloride/vinyl acetate copolymer (65:35)
P-18) n-butylacrylate/methylmethacrylate/n-butylmethacrylate copolymer (35:35:30)
P-19) diacetoneacrylamide/methylmethacrylate copolymer (50:50)
P-20) ethylmethacrylate/n-butylacrylate copolymer (70:30)
P-21) methylmethacrylate/cyclohexylacrylate copolymer (50:50)
P-22) tert-butylmethacrylamide/methylmethacrylate/acrylic acid copolymer (60:30:10)
P-23) n-butylacrylate/acrylic acid copolymer (80:20)
P-24) methylmethacrylate/isobutylmethacrylate/acrylic acid copolymer (52:28:20)
P-25) sec-butylacrylate/acrylic acid copolymer (85:15)
P-26) n-butylmethacrylate/pentylmethacrylate/methacrylic acid copolymer (38:38:24)
P-27) ethylmethacrylate/acrylic acid copolymer (95:5)
P-28) isopropylacrylate/acrylic acid copolymer (90:10)
P-29) butylmethacrylate/2-hydroxyethylmethacrylate/acrylic acid copolymer (85:5:10)
P-30) cyanoethylacrylate/benzylmethacrylate/acrylic acid copolymer (60:30:10)
P-31) isobutylmethacrylate/tetrahydrofurfurylacrylate/acrylic acid copolymer (60:30:10)
P-32) n-butylmethacrylate/tert-butylacrylamide/acrylic acid copolymer (55:37:8)
P-33) n-butylmethacrylate/1H,1H,2H,2H-perfluorodecylacrylate/acrylic acid copolymer (75:20:5)

P-34) methylmethacrylate/n-butylacrylate/acrylic acid copolymer (50:45:5)
P-35) 2-ethylhexylmethacrylate/methylacrylate/acrylic acid copolymer (40:55:5)
P-36) 3-methoxybutylmethacrylate/styrene/acrylic acid copolymer (35:50:15)
P-37) cyclohexylmethacrylate/acrylmethacrylate/acrylic acid copolymer (35:50:15)
P-38) isopropylmethacrylate/furfurylmethacrylate/acrylic acid copolymer (80:10:10)
P-39) isopropylmethacrylate/2-butoxyethylmethacrylate/acrylic acid copolymer (75:15:10)
P-40) ethylacrylate/phenylmethacrylate/acrylic acid copolymer (72:15:13)
P-41) isobutylmethacrylate/2-(2-ethoxyethoxy)ethylmethacrylate/acrylic acid copolymer (80:10:10)
P-42) isobutylmethacrylate/methacrylic acid ester of polyethylene glycol monomethyl ether (number of times ethyleneoxy chain repeats: 23)/acrylic acid copolymer (70:20:10)
P-43) isobutylmethacrylate/dipropylene glycol monomethacrylate/acrylic acid copolymer (85:5:10)
P-44) isobutylmethacrylate/methacrylic acid ester of polyethylene glycol monomethyl ether (number of times ethyleneoxy chain repeats: 9)/acrylic acid copolymer (80:10:10)
P-45) isobutylacrylate/glycidylmethacrylate/acrylic acid copolymer (75:15:10)
P-46) isobutylacrylate/methoxystyrene/acrylic acid copolymer (75:15:10)
P-47) isobutylacrylate/N-vinylpyrrolidone/acrylic acid copolymer (60:30:10)
P-48) tert-butylacrylate/methacrylic acid copolymer (88:12)
P-49) hexylacrylate/styrene/methacrylic acid copolymer (80:5:15)
P-50) 2,2,2-tetrafluoroethylmethacrylate/methylmethacrylate/methacrylic acid copolymer (25:60:15)
P-51) ethylmethacrylate/2-methoxyethylmethacrylate/methacrylic acid copolymer (70:15:15)
P-52) ethylmethacrylate/2-ethoxyethylmethacrylate/methacrylic acid copolymer (70:15:15)
P-53) vinylacetate/methacrylic acid copolymer (85:15)
P-54) n-butylmethacrylate/acrylamide/methacrylic acid copolymer (70:15:15)
P-55) tert-octylacrylamide/propylmethacrylate/methacrylic acid copolymer (20:65:15)
P-56) n-butylmethacrylate/butoxymethylacrylamide/methacrylic acid copolymer (80:5:15)
P-57) n-butylmethacrylate/diphenyl-2-methacryloyloxyethylphosphate/methacrylic acid copolymer (80:5:15)
P-58) isobutylmethacrylate/dimethylacrylamide/methacrylic acid copolymer (70:15:15)
P-59) n-butylmethacrylate/butylacrylamide/methacrylic acid copolymer (70:15:15)
P-60) n-butylmethacrylate/phenylacrylamide/methacrylic acid copolymer (70:15:15)
P-61) n-butylmethacrylate/methacrylamide/methacrylic acid copolymer (70:15:15)
P-62) n-butylmethacrylate/methoxyethylmethacrylamide/methacrylic acid copolymer (70:15:15)
P-63) n-butylmethacrylate/N-vinylpyrrolidone/methacrylic acid copolymer (70:15:15)
P-64) isobutylmethacrylate/1H,1H,2H,2H-perfluorodecylacrylate/methacrylic acid copolymer (55:30:15)
P-65) isobutylmethacrylate/2-(2-methoxyethoxy)ethylmethacrylate/methacrylic acid copolymer (50:35:15)
P-66) n-butylmethacrylate/styrenesulfonic acid copolymer (90:10)
P-67) ethylmethacrylate/styrenesulfonic acid copolymer (90:10)
P-68) n-butylacrylate/styrene/styrenesulfonic acid copolymer (80:10:10)
P-69) isobutylmethacrylate/styrenesulfonic acid copolymer (90:10)
P-70) isobutylacrylate/triethylene glycol monomethacrylate/styrenesulfonic acid copolymer (80:10:10)
P-71) n-butylacrylate/1H,1H,2H,2H-perfluorodecylmethacrylate/styrenesulfonic acid copolymer (80:10:10)
P-72) n-butylacrylate/2-butyoxyethylmethacrylate/styrenesulfonic acid copolymer (70:20:10)
P-73) n-butylmethacrylate/2-acrylamide-2-methylethanesulfonic acid copolymer (90:10)
P-74) n-butylacrylate/2-butoxyethylmethacrylate/2-acrylamide-2-methylethanesulfonic acid copolymer (70:20:10)
P-75) isobutylmethacrylate/2-acrylamide-2-methylethanesulfonic acid copolymer (90:10)
P-76) isobutylacrylate/n-butylmethacrylate/2-acrylamide-2-methylethanesulfonic acid copolymer (70:20:10)
P-77) ethylacrylate/tert-butylmethacrylate/2-acrylamide-2-methylethanesulfonic acid copolymer (60:30:10)
P-78) n-butylmethacrylate/2-acrylamide-2-methylpropanesulfonic acid copolymer (90:10)
P-79) ethylmethacrylate/2-acrylamide-2-methylpropanesulfonic acid copolymer (90:10)
P-80) ethylacrylate/tert-butylmethacrylate/2-acrylamide-2-methylpropanesulfonic acid copolymer (60:30:10)
P-81) n-butylacrylate/tert-butylmethacrylate/2-acrylamide-2-methylpropanesulfonic acid copolymer (60:30:10)
P-82) tert-butylacrylate/tetrahydrofurfurylacrylate/2-methylpropanesulfonic acid copolymer (50:40:10)
P-83) tert-butylacrylate/1H,1H,2H,2H-perfluorodecylmethacrylate/2-acrylamide-2-methylpropanesulfonic acid copolymer (60:30:10)
P-84) tert-butylacrylate/methacrylic acid ester of polyethylene glycol monomethyl ether (number of times ethyleneoxy chain repeats: 23)/2-acrylamide-2-methylpropanesulfonic acid copolymer (60:30:10)
P-85) isobutylacrylate/N-vinylpyrrolidone/2-acrylamide-2-methylpropanesulfonic acid copolymer (60:30:10)
P-86) ethylmethacrylate/2-acrylamide-2-methylpropane sulfonic acid soda copolymer (90.4:9.6)
P-87) n-butylmethacrylate/sodium 2-acrylamide-2-methylpropanesulfonate copolymer (98:12)
P-88) isobutylmethacrylate/sodium 2-acrylamide-2-methylpropanesulfonate copolymer (90.4:9.6)
P-89) n-butylmethacrylate/tert-butylmethacrylate/sodium 2-acrylamide-2-methylpropanesulfonate copolymer (50:35:15)
P-90) vinylpyrrolidone/isobutylmethacrylate/sodium 2-acrylamide-2-methylpropanesulfonate copolymer (50:35:15)
P-91) n-butylmethacrylate/2-methacrylamide-2-methylpropane sulfonic acid copolymer (90:10)
P-92) n-butylacrylate/tert-butylmethacrylate/2-methacrylamide-2-methylpropanesulfonic acid copolymer (60:30:10)
P-93) isobutylacrylate/hydroxymethylacrylamide/2-methacrylamide-2-methylpropanesulfonic acid copolymer (80:10:10)

P-94) n-butylacrylate/tert-butylmethacrylate/vinylsulfonic acid copolymer (60:30:10)
P-95) hexylmethacrylate/methylmethacrylate/vinylsulfonic acid copolymer (40:45:15)
P-96) ethylacrylate/tert-butylmethacrylate/vinylsulfonic acid copolymer (60:30:10)
P-97) n-butylmethacrylate/2-acrylamide-2-methylbutanesulfonic acid copolymer (90:10)
P-98) ethylmethacrylate/2-acrylamide-2-methylbutanesulfonic acid copolymer (90:10)
P-99) ethylacrylate/tert-butylmethacrylate/2-acrylamide-2-methylbutanesulfonic acid copolymer (60:30:10)
P-100) n-butylacrylate/tert-butylmethacrylate/2-acrylamide-2-methylbutanesulfonic acid copolymer (60:30:10)
P-101) ethylmethacrylate/sodium 2-acrylamide-2-methylbutanesulfonate copolymer (90.4:9.6)
P-102) n-butylmethacrylate/sodium 2-acrylamide-2-methylbutanesulfonate copolymer (98:12)
P-103) isobutylmethacrylate/sodium 2-acrylamide-2-methylbutanesulfonate copolymer (90.4:9.6)
P-104) n-butylmethacrylate/tert-butylmethacrylate/sodium 2-acrylamide-2-methylbutanesulfonate copolymer (50:35:15)
P-105) n-butylmethacrylate/2-methacrylamide-2-methylbutane sulfonic acid copolymer (90:10)

The molecular weight (Mw) of the vinyl polymer is usually 1000 through 100,000, and is preferably 3000 through 50,000.

When the molecular weight of the vinyl polymer is less than 1000, it is difficult to obtain a stable dispersed product of the coloring composition. When the molecular weight exceeds 100,000, the solubility into the organic solvent deteriorates, the viscosity of the organic solvent increases, and dispersion is difficult.

Preparation of Coloring Composition

The coloring composition of the present invention is prepared by dispersing coloring particulates, which contain said oil soluble dye and said oil soluble polymer, in a water based medium (a solution containing at least water). Specifically, for example, a latex of the oil soluble polymer may be prepared in advance and this latex may be added to the oil soluble dye, or the oil soluble polymer and the oil soluble dye may be co-emulsified and dispersed.

Among these methods, the co-emulsification and dispersion is preferable. A suitable example of such co-emulsification/dispersion is a method in which by adding water to an organic solvent containing the oil soluble polymer and the oil soluble dye, or by adding such an organic solvent into water, the organic solvent is emulsified and made into particulates.

The latex is a substance in which the water insoluble, oil-soluble polymer is dispersed, as fine particles, into a water based medium. The dispersed state may be the oil-soluble polymer being emulsified in a water based medium, the oil-soluble polymer being emulsion polymerized, the oil-soluble polymer being micelle dispersed, or the oil-soluble polymer having a partially hydrophilic structure in the molecule thereof and the molecule chain itself being dispersed in the form of molecules, or the like.

The average particle diameter of the latex is usually 1 to 500 nm, is preferably 3 to 300 nm, and is particularly preferably 3 to 200 nm.

The particle diameter distribution of the latex is not particularly limited, and may be a wide particle distribution or a monodisperse particle distribution.

Polymer particulates are discussed in *Synthetic Resin Emulsions* (*Gosei Jushi Emarujon*) (edited by Taira Okuda and Hiroshi Inagaki, Polymer Publication Society (1978)), and *Polymer Latex Chemistry* (*Kobunshi Ratekkusu no Kagaku*) (Soichi Muroi, Polymer Publication Society (1970)), and the like.

Here, a method in which a latex of an oil-soluble polymer is prepared in advance and the latex is made to contain an oil-soluble dye will be described. A vinyl polymer is used as the oil-soluble polymer herein.

A first example of this method includes a first step of preparing the vinyl polymer latex, a second step of preparing a dye solution in which the oil-soluble dye is dissolved in an organic solvent, and a third step of mixing the dye solution and the vinyl polymer latex together so as to prepare a coloring composition.

A second example of this method includes a first step of preparing a vinyl polymer latex, a second step of preparing a dye solution in which an oil-soluble dye is dissolved in an organic solvent and this dye solution is mixed with a liquid containing at least water so as to prepare a dye particulate dispersion solution, and a third step of mixing the vinyl polymer latex and the dye particulate dispersion solution together so as to form the coloring composition.

A third example of this method is the method disclosed in JP-A No. 55-139471.

Here, the aforementioned co-emulsion dispersion method will be described. Vinyl polymer is used as the oil-soluble polymer herein.

A first example of this method includes a first step of preparing a vinyl polymer dye solution in which the oil soluble dye and the vinyl polymer are dissolved in an organic solvent, and a second step of preparing the coloring composition by mixing together the vinyl polymer dye solution and a liquid containing at least water.

A second example of this method includes a first step of preparing a dye solution in which an oil soluble dye is dissolved in an organic solvent, a second step of preparing a vinyl polymer solution in which the vinyl polymer is dissolved, and a third step of mixing together the dye solution, the vinyl polymer solution, and a liquid containing at least water, so as to prepare the coloring composition.

A third example of this method includes a first step of preparing a dye solution in which the oil soluble dye is dissolved in an organic solvent and mixing together the dye solution and a liquid containing at least water so as to prepare a dye particulate dispersion liquid, a second step of preparing a vinyl polymer solution in which the vinyl polymer is dissolved and mixing the vinyl polymer solution with a liquid containing at least water so as to prepare a vinyl polymer particulate dispersion liquid, and a third step of mixing together the dye particulate dispersion liquid and the vinyl polymer particulate dispersion liquid so as to prepare a coloring composition.

A fourth example of this method includes a first step of preparing a vinyl polymer solution in which the vinyl polymer is dissolved in an organic solvent, a second step of preparing a dye solution in which the oil soluble dye is dissolved and mixing the dye solution together with a liquid containing at least water so as to prepare a dye particulate dispersion liquid, and a third step of mixing together the vinyl polymer solution and the dye particulate dispersion liquid so as to prepare a coloring composition.

In the coloring composition, the amount of the oil soluble polymer (vinyl polymer) which is used is preferably 10 to 600 parts by mass, and more preferably 50 to 400 parts by mass, with respect to 100 parts by mass of the oil soluble dye.

When the amount of the oil soluble polymer (vinyl polymer) which is used is less than 10 parts by mass, it becomes difficult to achieve fine and stable dispersion. When the amount used exceeds 600 parts by mass, the ratio of the oil soluble dye in the coloring composition is low, and there is little leeway in the designing of the compounding when the coloring composition is used as a water based ink.

Organic Solvent

The organic solvent used in preparing the coloring composition is not particularly limited, and may be appropriately selected on the basis of the solubility of the oil soluble dye or the oil soluble polymer (vinyl polymer). Examples of the organic solvent include ketone solvents such as acetone, methylethylketone, and diethylketone; alcohol solvents such as methanol, ethanol, 2-propanol, 1-propanol, 1-butanol, and tert-butanol; chlorine solvents such as chloroform and methylene chloride; aromatic group solvents such as benzene and toluene; ester solvents such as ethyl acetate, butyl acetate, and isopropyl acetate; ether solvents such as diethylether, tetrahydrofuran, and dioxane; and glycol ether solvents such as ethylene glycol monomethyl ether and ethylene glycol dimethyl ether.

A single type of organic solvent may be used, or two or more types may be used in combination.

The amount of the organic solvent which is used is not particularly limited provided that it falls within a range which does not adversely affect the effects of the present invention. However, an amount of 10 to 2000 parts by mass is preferable and an amount of 100 to 1000 parts by mass is more preferable, with respect to 100 parts by mass of the oil soluble polymer (vinyl polymer).

If the used amount of the organic solvent is less than 10 parts by mass, it is difficult for the coloring particulates to be dispersed finely and stably. If the used amount of the organic solvent exceeds 2000 parts by mass, processes of solvent-removal and concentration for removing the organic solvent are required, and there is less leeway in the designing of the compounding.

When the organic solvent has a solubility of 10% or less with respect to water, or when the vapor pressure of the organic solvent is greater than that of water, it is preferable to remove the solvent from the standpoint of stability of the coloring composition.

Removal of the organic solvent can be carried out at 10° C. to 100° C. at normal pressure to reduced pressure conditions. It is preferable to carry out removal of the organic solvent at 40 to 100° C. at normal pressure or at 10 to 50° C. at reduced pressure.

Additives

The coloring composition of the present invention may contain additives, which are appropriately selected in accordance with the object, provided that they are within a range that does not adversely affect the effects of the present invention.

Examples of additives include neutralizing agents, dispersion aids, dispersion stabilizers, and the like.

When the oil soluble polymer (vinyl polymer) has an un-neutralized ionic group, a neutralizing agent is suitably used from the standpoints of adjustment of pH, adjustment of the self-emulsifying property, provision of dispersion stability and the like of the coloring composition.

Examples of the neutralizing agent are organic bases and inorganic alkalis.

Examples of the organic base include triethanolamine, diethanolamine, N-methyldiethanolamine, dimethylethanolamine and the like.

Examples of the inorganic alkali include hydroxides of alkali metals (e.g., sodium hydroxide, lithium hydroxide, potassium hydroxide, and the like), carbonates (e.g., sodium carbonate, sodium hydrogencarbonate, and the like), ammonia and the like.

From the standpoint of improving the dispersion stability of the coloring composition, the neutralizing agent is preferably added such that the pH of the coloring composition becomes 4.5 to 10.0, and more preferably becomes 6.0 to 10.0.

Dispersion aids and dispersion stabilizers may be added in the vinyl polymer latex, the vinyl polymer solution, the dye solution, the solution containing at least water, or the like. However, it is preferable that the dispersion aid or dispersion stabilizer be added to a solution which contains the vinyl polymer, the dye solution and the solution containing at least water, in a step prior to the preparation of the vinyl polymer and/or the dye particulate dispersion liquid.

Examples of the dispersion aid and the dispersion stabilizer are any of cationic, anionic, and nonionic surfactants, water soluble or water dispersible low molecular compounds, oligomers, and the like. The added amount of the dispersion aid and the dispersion stabilizer is 0 to 100% by mass, and preferably 0 to 20% by mass, with respect to the total mass of the oil soluble dye and the oil soluble polymer (vinyl polymer).

Coloring Particulates

In the coloring particulates, it is preferable that the oil soluble dye is dispersed in the oil soluble polymer.

The amount of the coloring particulates contained in the coloring composition is preferably 1 to 45% by mass, and more preferably 2 to 30% by mass. The contained amount can be adjusted appropriately by dilution, evaporation, ultra-filtering or the like.

The average particle diameter of the coloring particulates is preferably 1 to 500 nm, more preferably 3 to 300 nm, and particularly preferably 3 to 200 nm. The average particle diameter can be adjusted by centrifugal separation, filtering or the like.

Applications of Coloring Composition

The coloring composition of the present invention can be applied to any of various fields, and is suitable for water based inks for writing, water based printing inks and inks for information recording. The coloring composition of the present invention is particularly suitably used for the following inks for an ink jet of the present invention.

When the coloring composition is used as an ink such as a water based ink for writing, a water based printing ink, an ink for information recording or the like, the material to be recorded by using the ink is not particularly limited and known materials may be used, for example, regular paper, resin coated paper, paper for exclusive use with ink jets, film, paper which can be used for electronic photography as well, cloth, glass, metal, porcelain, and the like.

Ink for Ink Jet and Ink Jet Recording Method

The ink for an ink jet of the present invention contains the coloring composition of the present invention, and contains other components which are appropriately selected as needed.

In the ink jet recording method of the present invention, recording is carried out by using the ink for an ink jet of the present invention. The ink nozzles and the like used at this time are not particularly limited, and can be selected appropriately in accordance with the object.

Other Components

The other components may be included, provided that they are included within a range which does not adversely affect the effects of the present invention.

Examples of the other components are known additives such as drying preventing agents, penetration accelerators, ultraviolet light absorbers, antioxidants, anti-fungal agents, pH adjusters, surface tension adjusting agents, anti-foaming agents, viscosity adjusting agents, dispersion aids, dispersion stabilizers, anti-rusting agents, chelating agents, and the like.

The drying preventing agent is suitably used for the purpose of preventing clogging due to the ink for the ink jet drying at the ink jetting opening of the nozzle used in the ink jet recording method.

The drying preventing agent is preferably a water soluble organic solvent having a vapor pressure which is less than that of water. Specific examples thereof include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, trimethylol propane, and the like; lower alkyl ethers of polyhydric alcohols such as ethylene glycol monomethyl (or ethyl) ether, diethylene glycol monomethyl (or ethyl) ether, triethylene glycol monoethyl (or butyl) ether or the like; heterocyclics such as 2-pyrrolidone, N-methyl-2-pyrrolidone, 1,3-dimethyl-2-imidazolidinone, N-ethylmorpholine and the like; sulfur-containing compounds such as sulfolane, dimethylsulfoxide, 3-sulfolene and the like; polyfunctional compounds such as diacetone alcohol, diethanol amine, and the like; and urea derivatives.

Among these, polyhydric alcohols such as glycerin, diethylene glycol and the like are preferable. A single type of drying preventing agent may be used, or two or more types may be used in combination.

The amount of the drying preventing agent contained in the ink for an ink jet is preferably 10 to 50% by mass.

The penetration accelerator is preferably used for the purpose of better penetration of the ink for an ink jet into paper.

Examples of the penetration accelerator include alcohols such as ethanol, isopropanol, butanol, di(tri)ethylene glycol monobutyl ether, 1,2-hexanediol and the like; sodium lauryl sulfate, sodium oleate, nonionic surfactants, and the like.

The penetration accelerator is contained in a range which does not cause bleeding of the printed characters or print through. If the penetration accelerator is contained in the ink for an ink jet in an amount of 5 to 30% by mass, sufficient effects will usually be exhibited.

The UV light absorber is used for the purpose of improving the storability of images.

Examples of the UV light absorber are the benzotriazole compounds disclosed in JP-A Nos. 58-185677, 61-190537, 2-782, 5-197075, 9-34057, and the like; the benzophenone compounds disclosed in JP-A Nos. 46-2784, 5-194483, U.S. Pat. No. 3,214,463 and the like; the cinnamic acid compounds disclosed in JP-B Nos. 48-30492 and 56-21141, JP-A No. 10-88106 and the like; the triazine compounds disclosed in JP-A Nos. 4-298503, 8-53427, 8-239368, 10-182621, Japanese National Publication No. 8-501291, and the like; the compounds disclosed in Research Disclosure No. 24239; and compounds that absorb ultraviolet light and emit fluorescent light (so-called fluorescent whitening agents) such as stilbene compounds and benzooxazole compounds.

Antioxidants are used for the purpose of improving the storability of images.

For example, any of various types of organic color fading preventing agents and metal complex color fading preventing agents can be used as the antioxidant.

Examples of organic color fading preventing agents are hydroquinones, alkoxyphenols, dialkoxyphenols, phenols, anilines, amines, indanes, chromans, alkoxyanilines, heterocyclics, and the like.

Examples of metal complex color fading preventing agents include nickel complexes and zinc complexes. Specific examples include the compounds disclosed in Research Disclosure No. 17643 (VII, I through J), Research Disclosure No. 15162, Research Disclosure No. 18716 (page 650, left column), Research Disclosure No. 36544 (page 527), Research Disclosure No. 307105 (page 872), the compounds disclosed in the patents cited in Research Disclosure No. 15162, and the compounds included in the compound examples and general formulas of representative compounds disclosed on pages 127 through 137 of JP-A No. 62-215272.

Examples of the anti-fungal agent are sodium dehydroacetate, sodium benzoate, sodium pyridinethion-1-oxide, ethyl p-hydroxybenzoate, 1,2-benzoisothiazoline-3-on, and salts thereof. It is preferable to use the anti-fungal agent in the ink in an amount of 0.02 to 1.00% by mass.

A neutralizing agent (an organic base, an inorganic alkali) can be used as the pH adjusting agent. The pH adjusting agent is used for the purpose of improving the storage stability of the ink for an ink jet, and is preferably added such that the pH of the ink for an ink jet becomes 6 to 10, and more preferably becomes 7 to 10.

Nonionic, cationic and anionic surfactants are examples of the surface tension adjusting agent.

The surface tension of the ink for an ink jet of the present invention is preferably 25 to 70 m N/m, and more preferably 25 to 60 m N/m.

The viscosity of the ink for an ink jet of the present invention is preferably 30 mPa·s or less, and more preferably 20 mPa·s or less.

An anti-foaming agent, for example, a fluorine based or silicone based compound or a chelating agent such as EDTA, can be used if needed.

The ink for an ink jet of the present invention can be suitably used for printing of characters or the like onto a known material to be recorded.

The material to be recorded is not particularly limited, but paper used exclusively for ink jets is preferable.

Examples of paper used exclusively for ink jets are disclosed in JP-A Nos. 8-169172, 8-27693, 2-276670, 7-276789, 9-323475, 62-238783, 10-153989, 10-217473, 10-235995, 10-337947, 10-217597, 10-337947 and the like.

In the present invention, other than paper used exclusively for ink jets, the following recording papers and recording films are suitably used as the material to be recorded.

The recording paper or recording film is a structure in which a support and an ink receiving layer are layered together, and if necessary, other layers such as a backcoat layer or the like are also layered.

One or more ink receiving layers may be provided. For the other layers as well, one or more of each type of layer may be provided.

Examples of the support include chemical pulp such as LBKP, NBKP and the like; mechanical pulp such as GP, PGW, RMP, TMP, CTMP, CMP, CGP, and the like; and used paper pulp such as DIP or the like. If needed, known pigments, binders, sizing agents, fixing agents, cationic agents, paper strength reinforcing agents and the like may be mixed in with the pulp. The support may be formed by using any type of machine such as a fourdrinier machine, a cylinder machine, or the like.

The support may be a synthetic paper, a plastic film sheet or the like.

The thickness of the support is preferably about 10 to 250 μm, and the weight thereof is preferably 10 to 250 g/m².

The ink receiving layer, as well as the backcoat layer which is selected as needed, may be directly laminated onto the support. Alternatively, the ink receiving layer and the backcoat layer may be provided after subjected to size pressing or coating of an undercoat layer by using starch, polyvinyl alcohol or the like.

The support may be subjected to flattening processing by a calendar device such as a machine calendar, a TG calendar, a soft calendar or the like.

Among the substrates, paper whose both surfaces are laminated with polyolefin (e.g., polyethylene, polystyrene, polyethyleneterephthalate, polybutene, and copolymers thereof), and plastic film are preferable. It is more preferable to include in the polyolefin a white pigment (e.g., titanium oxide, zinc oxide) or a hue providing dye (e.g., cobalt blue, ultramarine blue, neodium oxide).

The ink receiving layer includes a pigment, water based binder, mordant, water-proofing agent, light-resistance improving agent, surfactant, and other additives.

As the pigment, a white pigment is preferable.

Examples of the white pigment include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide, zinc carbonate, and the like; and organic pigments such as styrene pigments, acrylic pigments, urea resins, melamine resins and the like.

Among these, porous inorganic pigments are preferable, and synthetic amorphous silica whose pores have a large surface area is particularly preferable.

Either silicic anhydride obtained by a dry-type production method or a hydrated silicic acid obtained by a wet-type production method can be used as the synthetic amorphous silica. However, hydrated silicic acid is particularly preferable.

Examples of the water based binder include water soluble polymers such as polyvinyl alcohol, silanol modified polyvinyl alcohol, starch, cationic starch, casein, gelatin, carboxymethyl cellulose, hydroxyethyl cellulose, polyvinylpyrrolidone, polyalkylene oxide, polyalkylene oxide derivatives and the like; water dispersible polymers such as styrene-butadiene latex, acrylic emulsions, and the like; and the like.

One type of water based binder may be used, or two or more types may be used in combination.

Among these, polyvinyl alcohol and silanol modified polyvinyl alcohol are preferable from the standpoints of adhesion to the pigment and separation-resistance of the ink receiving layer.

The mordant is preferably immobilized, and thus, a polymer mordant is preferable.

Examples of polymer mordants are disclosed in JP-A Nos. 48-28325, 54-74430, 54-124726, 55-22766, 55-142339, 60-23850, 60-23851, 60-23852, 60-23853, 60-57836, 60-60643, 60-118834, 60-122940, 60-122941, 60-122942, 60-235134, 1-161236, and U.S. Pat. Nos. 2,484,430, 2,548,564, 3,148,061, 3,309,690, 4,115,124, 4,124,386, 4,193,800, 4,273,853, 4,282,305, and 4,450,224. The polymer mordants disclosed on pages 212 to 215 of JP-A No. 1-161236 are suitably used. It is preferable to use these polymer mordants because images having excellent image quality are obtained and light-resistance of the images is improved.

The water-proofing agent is used for the purpose of making the images waterproof.

Cationic resins are preferable as the water-proofing agent.

Examples of the cationic resin include polyamidepolyamine epichlorohydrine, polyethyleneimine, polyaminesulfone, dimethyldiallyl ammonium chloride polymer, cationic polyacrylamide, and the like. Among these cationic resins, polyamidepolyamine epichlorohydrine is particularly preferable.

The contained amount of the cationic resin is preferably 1 to 15% by mass, and more preferably 3 to 10% by mass, with respect to the total solid content of the ink receiving layer.

Examples of the light-resistance improving agent are zinc sulfate, zinc oxide, hindered amine antioxidants, benzotriazole ultraviolet light absorbers such as benzophenone, and the like. Among these, zinc sulfate is particularly preferable.

The surfactant functions as a coating aid, a detachability improving agent, a slippage improving agent, and an anti-static agent.

Examples of the surfactants are disclosed in JP-A Nos. 62-173463 and 62-183457.

Organic fluoro compounds may be used instead of the surfactant.

It is preferable that the organic fluoro compounds are hydrophobic.

Examples of the organic fluoro compounds are fluorine based surfactants, oily fluorine-based compounds (e.g., fluorine oil), and solid fluorine based compound resins (e.g., tetrafluoroethylene resin), as well as the compounds disclosed in JP-B No. 57-9053 (columns 8 through 17), and JP-A Nos. 61-20994 and 62-135826.

Examples of other additives are pigments dispersion aids, thickeners, anti-foaming agents, dyes, fluorescent whitening agents, preservatives, pH adjusting agents, matte agents, film hardeners, and the like.

The backcoat layer includes a white pigment, a water based binder and other components.

Examples of the white pigments are white inorganic pigments such as light-weight calcium carbonate, heavy-weight calcium carbonate, kaolin, talc, calcium sulfate, barium sulfate, titanium dioxide, zinc oxide, zinc sulfade, zinc carbonate, satin white, aluminum silicate, diatomaceous earth, calcium silicate, magnesium silicate, synthetic amorphous silica, colloidal silica, colloidal alumina, pseudo boehmite, aluminum hydroxide, alumina, lithopone, zeolite, hydrated halloysite, magnesium carbonate, magnesium hydroxide, and the like; and organic pigments such as styrene based plastic pigments, acrylic based plastic pigments, polyethylene, microcapsules, urea resins, melamine resins and the like.

Examples of the water based binder include water soluble polymers such as styrene/maleate salt copolymer, styrene/ acrylate salt copolymer, polyvinyl alcohol, silanol modified polyvinyl alcohol, starch, cationized starch, casein, gelatin, carboxymethyl cellulose, hydroxyethyl cellulose, polyvinylpyrrolidone, and the like; water dispersible polymers such as styrene butadiene latex, acrylic emulsion, and the like; and the like.

Examples of the other components are anti-foaming agents, foaming suppressing agents, dyes, fluorescent whitening agents, preservatives, waterproofing agents, and the like.

A polymer latex may be added to each of the layers of the recording paper and the recording film.

The polymer latex is used for the purpose of improving the film properties such as stability of dimensions, prevention of curling, prevention of adhesion, prevention of cracking of the film, and the like.

Examples of the polymer latex are those disclosed in JP-A Nos. 62-245258 and 62-110066. When a polymer latex having a low glass transition temperature (of 40° C. or less) is added to a layer including the mordant, cracking and curling of the layer can be prevented. Further, by adding a polymer latex having a high glass transition temperature to the backcoat layer, curling can be prevented.

The ink for an ink jet of the present invention can be applied to any ink jet recording method. For example, the ink for an ink jet of the present invention can be suitably used in a charge control method in which ink is discharged by utilizing electrostatic attraction; a drop on demand method (pressure pulse method) utilizing the vibration pressure of a piezo element; an acoustic ink jet method in which electric signals are converted to acoustic beams, the beams are applied to the ink, and the emission pressure is utilized so as to discharge the ink; a thermal ink jet (bubble jet) method in which the ink is heated to form air bubbles and the generated pressure is utilized; and the like.

The above ink jet recording methods include a method in which plural drops of an ink, which has a low density and is called a photoink, are expelled in small volumes; a method in which image quality is improved by using plural inks having substantially the same hue and different densities; and a method utilizing a colorless, transparent ink.

EXAMPLES

Hereinafter, Examples of the present invention are described. However, it is to be noted that the present invention is not limited to these Examples. Note that hereinafter, "parts" and "%" refer to "parts by mass" and "% by mass" unless otherwise specified.

Synthesis Example 1

Synthesis of Oil Soluble Dye D-2

Example Compound (D-2) was synthesized on the basis of the following reaction formula. In the reaction formula, the synthesis of the first compound (a) (the compound at the left side of the arrow in the reaction formula) is disclosed in JP-A No. 10-62926.

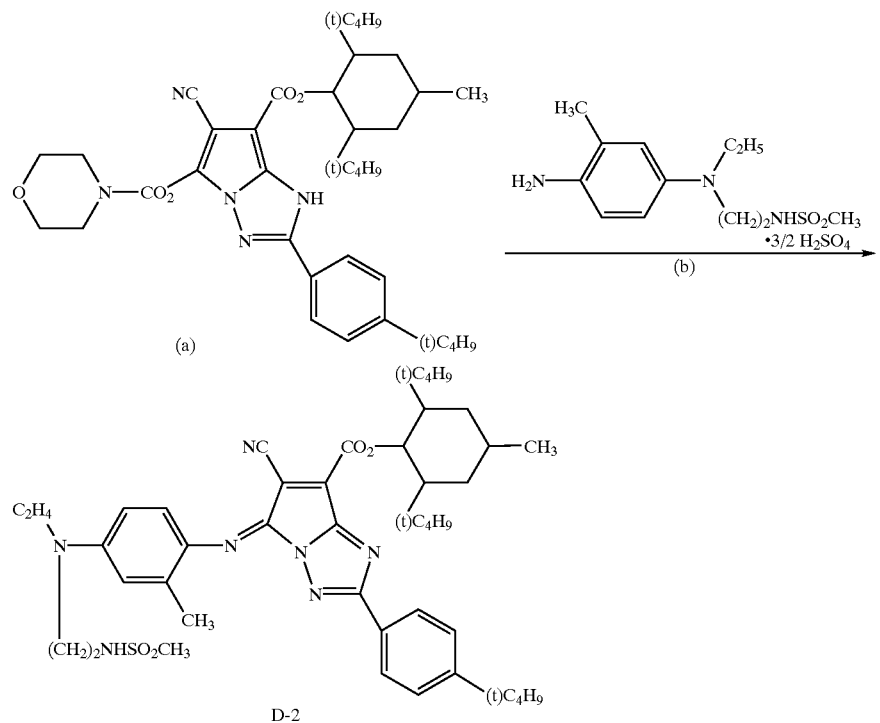

64.5 g of the first compound (1) (the compound at the left side of the arrow in the reaction formula), 52.4 g of the second compound (b) (the compound above the arrow in the reaction formula), 82.8 g of potassium carbonate, 300 ml of ethyl acetate, and 100 ml of N,N-dimethyl acetoamide were placed in a three-necked flask and stirred for 5 minutes at room temperature. Thereafter, an aqueous solution, in which 27.4 g of peroxo ammonium disulfate was dissolved in 60 ml of water, was added thereto dropwise over 15 minutes. After addition was completed, the mixture was stirred for a further two hours. Thereafter, 500 ml of ethyl acetate and 500 ml of water were added and the oil soluble phase was extracted, and the obtained ethyl acetate layer was washed five times with a mixed solution of 700 ml of water and 200 ml of a saturated saline solution. The obtained ethyl acetate layer was dried by sodium sulfuric anhydride, and condensed by using a rotary evaporator. The obtained residual substance was purified by silica gel column chromatography, and 69.0 g of the desired Example Compound (D-2) was obtained (yield 88%).

Synthesis Example 2

Synthesis of Oil Soluble Dye D-25

Example Compound (D-25) was synthesized on the basis of the following reaction formula. Synthesis of the first compound (c) (the compound at the left side of the arrow in the reaction formula) is disclosed in JP-A No. 5-177959.

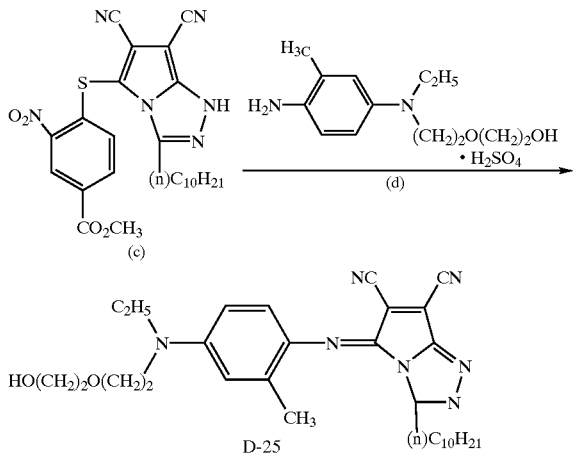

50.8 g of the first compound (c) (the compound at the left side of the arrow in the reaction formula), 40.4 g of the second compound (d) (the compound above the arrow in the reaction formula), 82.8 g of potassium carbonate, 300 ml of ethyl acetate, and 100 ml of N,N-dimethyl acetoamide were placed in a three-necked flask and stirred for 5 minutes at room temperature. Thereafter, 200 ml of isopropyl alcohol and 400 ml of water were added, and the mixture was further stirred for 5 minutes. An aqueous solution in which 27.4 g of peroxo ammonium disulfate was dissolved in 60 ml of water was added thereto dropwise over 15 minutes. After addition was completed, the mixture was stirred for a further two hours. Thereafter, 500 ml of ethyl acetate and 500 ml of water were added and the oil soluble phase was extracted, and the obtained ethyl acetate layer was washed five times with a mixed solution of 700 ml of water and 200 ml of a saturated saline solution. The obtained ethyl acetate layer was dried by sodium sulfuric anhydride, and condensed by using a rotary evaporator. The obtained residual substance was purified by silica gel column chromatography, and 47.8 g of the desired Example Compound (D-25) was obtained (yield 90%).

Synthesis Example 3

Synthesis of Vinyl Polymer P-33

A mixed solution of 37.5 parts of n-butylmethacrylate, 10.0 parts of 1H,1H,2H,2H-per-fluorodecylacrylate, and 2.5 parts of acrylic acid was prepared.

Next, 40 parts of isopropyl alcohol, 60 parts of dichloroethane, and 0.25 parts of dimethyl 2,2'-azobis(2-methylpropionate) were placed in a flask. While stirring was carried out under nitrogen sealing, the temperature was raised to 80° C. Thereafter, the above mixed solution was added dropwise over two hours. After this dropwise addition was completed, 0.05 parts of dimethyl 2,2'-azobis(2-methylpropionate) was added, and a reaction was carried out for 5 hours at the same temperature. The desired vinyl polymer was thus obtained.

The content of the ionic groups in the obtained vinyl polymer was 0.69 mmol/g. The molecular weight (Mw) of the vinyl polymer was 61000. The solid content of the solution was 35%. Hereinafter, the solution of this vinyl polymer will be called vinyl polymer solution (A-1).

Synthesis Example 4

Synthesis of Vinyl Polymer P-27

Processes were carried out in the same way as in the above-described Synthesis Example 3, except that, instead of the 37.5 parts of butyl methacrylate, the 10.0 parts of the 1H,1H,2H,2H-perfluorodecylacrylate, and the 2.5 parts of acrylic acid used in Synthesis Example 3, a mixed solution of 47.5 parts of ethyl methacrylate, 0.4 parts of dodecylmercaptan, and 2.5 parts of acrylic acid was used.

The content of the ionic groups in the obtained vinyl polymer was 0.69 mmol/g. The molecular weight (Mw) of the vinyl polymer was 24000, and the solid content of the solution was 34%. Hereinafter, this vinyl polymer solution will be called vinyl polymer solution (A-2).

Synthesis Example 5

Synthesis of Vinyl Polymer P-34

A mixed solution formed from 23.8 parts of methylmethacrylate, 23.8 parts of n-butylacrylate, and 2.5 parts of acrylic acid was prepared. Next, 100 parts of isopropyl alcohol, and 0.25 parts of dimethyl 2,2'-azobis(2-methylpropionate) were placed in a flask. While stirring was carried out under nitrogen sealing, the temperature was raised to 80° C. Thereafter, the above mixed solution was added in drops over two hours. After this dropwise addition was completed, 0.05 parts of dimethyl 2,2'-azobis(2-methylpropionate) was added, and a reaction was carried out at the same temperature for 10 hours. The desired vinyl polymer was thus obtained.

The content of the ionic groups in the obtained vinyl polymer was 0.68 mmol/g. The molecular weight (Mw) of the obtained vinyl polymer was 42000, and the content of solids in the solution was 36%. Hereinafter, this vinyl polymer solution will be referred to as vinyl polymer solution (A-3).

Synthesis Example 6

Synthesis of Vinyl Polymer P-86

A mixed solution of 72.3 parts of ethyl methacrylate, 7.7 parts of sodium 2-acrylamide-2-methylpropanesulfonate, 25 parts of water, and 70 parts of isopropyl alcohol was prepared. Next, 20 parts of isopropyl alcohol and 0.4 parts of dimethyl 2,2'-azobis(2-methylpropionate) were placed in a flask. While stirring was carried out under nitrogen sealing, the temperature was raised to 80° C. Thereafter, the above mixed solution was added in drops over three hours. After this dropwise addition was completed, 0.2 parts of dimethyl 2,2'-azobis(2-methylpropionate) was added, and a reaction was carried out at the same temperature for eight hours. The desired vinyl polymer was thus obtained.

The content of the ionic groups in the obtained vinyl polymer was 0.42 mmol/g. The molecular weight (Mw) of the obtained vinyl polymer was 56000, and the content of solids in the solution was 47%. Hereinafter, this vinyl polymer solution will be referred to as vinyl polymer solution (A-4).

Preparation Example 1

(Preparation of Coloring composition (B-1))

2.3 parts of 2 mol/L sodium hydroxide was gradually added to a mixed solution of 4 parts of isopropyl alcohol, 6 parts of tert-butanol, 9.1 parts of the vinyl polymer solution (A-1), and 0.8 parts of the oil soluble dye (D-2). Thereafter, after the temperature was raised to 80° C., 50 parts water was added while stirring was carried out. This solution was concentrated at 40° C. under reduced pressure so as to prepare a coloring composition having a solid content of 20%. The particle diameter of the coloring particulates in the coloring composition was a volume average diameter of 35 nm (as measured by MICROTRACK UPA 150 manufactured by Nikiso KK). Hereinafter, this dispersion is called coloring composition (B-1).

Preparation Example 2

(Preparation of Coloring composition B-2)

2.3 parts of 2N sodium hydroxide was gradually added to a mixed solution of 4 parts of isopropyl alcohol, 6 parts of tetrahydrofuran, 9.4 parts of the vinyl polymer solution (A-2), and 0.8 parts of the oil soluble dye (D-25). Thereafter, after the temperature was raised to 70° C., 50 parts water was added while stirring was carried out. This solution was concentrated at 40° C. under reduced pressure so as to prepare a coloring composition having a solid content of 20%. The particle diameter of the coloring particulates in the coloring composition was a volume average diameter of 43 nm. Hereinafter, this dispersion is called coloring composition (B-2).

Preparation Example 3

Preparation of Coloring composition B-3

1.9 parts of 1N sodium hydrogencarbonate was gradually added to a mixed solution of 10 parts of tert-butanol, 7.8 parts of the vinyl polymer solution (A-3), and 1.2 parts of the oil soluble dye (D-2). Thereafter, after the temperature was raised to 75° C., 45 parts water was added while stirring was carried out. This solution was concentrated at 40° C. under reduced pressure so as to prepare a coloring composition having a solid content of 20%. The particle diameter of the coloring particulates in the coloring composition was a volume average diameter of 52 nm. Hereinafter, this dispersion is called coloring composition (B-3).

Preparation Example 4

Preparation of Coloring composition B-4

The temperature of a mixed solution of 8 parts of tert-butanol, 2 parts of 2-butanone, 6.0 parts of the vinyl polymer solution (A-4), and 1.2 parts of the oil soluble dye (D-25) was raised to 75° C. Thereafter, 45 parts water was added while stirring was carried out. This solution was concentrated at 40° C. under reduced pressure so as to prepare a coloring composition having a solid content of 20%. The particle diameter of the coloring particulates in the coloring composition was a volume average diameter of 28 nm. Hereinafter, this dispersion is called coloring composition (B-4).

Preparation Example 5

Preparation of Coloring composition B-5

The same processes as those in above Preparation Example 2 were carried out except that the oil soluble dye (D-2) in Preparation Example 2 was replaced with the following compound (H-1), so as to prepare a coloring composition having a solid content of 20%. The particle diameter of the coloring particulates in the coloring composition was a volume average diameter of 63 nm. Hereinafter, this dispersion is called coloring composition (B-5).

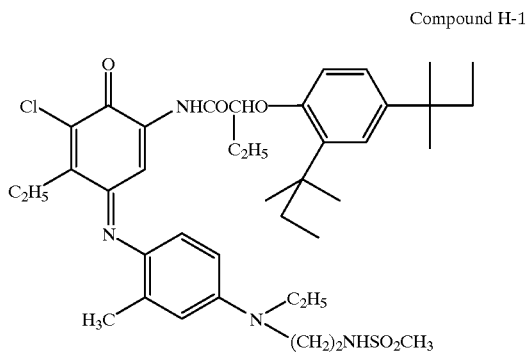

Compound H-1

Example 1

10 parts of diethylene glycol, 8 parts of glycerin, 8 parts of triethylene glycol monobutylether, 4 parts of an aqueous solution (EMARU 20C manufactured by Kao Corp.) which was 25% surfactant, and 8 parts of an ion exchanged water were mixed with 62 parts of the coloring composition (B-1) prepared in Preparation Example 1. The mixture was filtered by a 0.2 μm filter, and a water based ink for an ink jet was prepared.

Example 2

An ink for an ink jet was prepared in the same way as in Example 1, except that the coloring composition (B-1) in Example 1 was replaced with the coloring composition (B-2) prepared in Preparation Example 2.

Example 3

10 parts of diethylene glycol, 8 parts of glycerin, 8 parts of triethylene glycol monobutyl ether, 4 parts of an aqueous solution (EMARU 20C manufactured by Kao Corp.) which was 25% surfactant, and 28 parts of an ion exchanged water were mixed with 42 parts of the coloring composition (B-3) prepared in Preparation Example 3. The mixture was filtered by a 0.2 μm filter, and an ink for an ink jet was prepared.

Example 4

An ink for an ink jet was prepared in the same way as in Example 3, except that the coloring composition (B-3) in Example 3 was replaced with the coloring composition (B-4) prepared in Preparation Example 4.

Comparative Example 1

An ink for an ink jet was prepared in the same way as in Example 1, except that the coloring composition (B-1) in Example 1 was replaced with the coloring composition (B-5) prepared in Preparation Example 5.

Comparative Example 2

10 parts of diethylene glycol, 8 parts of glycerin, 10 parts of tetraethylene glycol monobutyl ether, 1 part of diethanolamine and 67 parts of an ion exchanged water were mixed together with 4 parts of the following comparative dye (H-2). The mixture was filtered by a 0.2 μm filter, and an ink for an ink jet was prepared.

C. I. Direct Blue 87

Compound H-2

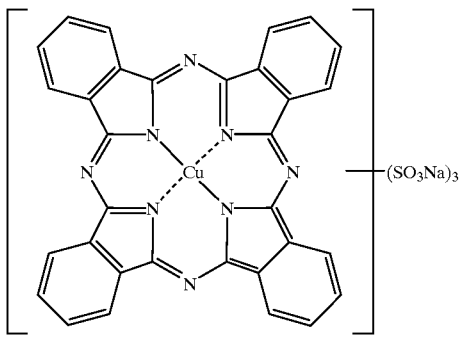

Image Recording and Evaluation

The following evaluation was carried out for the inks for an ink jet of the respective Examples and Comparative Examples. The results are shown in Table 1.

In Table 1, "Absorption of Water Dispersion" means the evaluation of the spectral absorption characteristic of the ink for an ink jet. Further, "Color Tone", "Dependence on Paper", "Water-Resistance" and "Light-Resistance" were evaluated after recording an image with the ink for the ink jet onto a photo glossy paper (a photo grade ink jet paper manufactured by Fuji Photo Film Co., Ltd.) by using an ink jet printer (PM-700C manufactured by Epson Co.).

Spectral Absorption Characteristic

Each of the inks for an ink jet was diluted with ion exchanged water such that the absorbance thereof was 0.8 to 1.2, and the visible absorption spectrum was measured. When the absorbance at the wavelength of maximum absorption ($\lambda$max (nm)) was 1, the absorbance at the wavelength ($\lambda$max−100 (nm)) was measured.

Color Tone

The recorded image was visually observed, and was judged as either being A (good) or B (poor).

Dependency on Paper

The color tone of the image formed on the photo glossy paper and the color tone of an image formed separately on a regular paper for PPC were compared. If the difference between the two images was slight, an evaluation of A (good) was given. If the difference between the two images was great, an evaluation of B (poor) was given.

Water-Resistance

The photoglossy paper on which the image was formed was dried at room temperature for one hour. Thereafter, the paper was submerged in water for 30 seconds, was naturally dried at room temperature, and the bleeding thereof was observed. Papers in which there was no bleeding received an evaluation of A, papers in which there was slight bleeding received a B, and papers in which there was much bleeding received a C.

Light-Resistance

The photo glossy paper on which the image was formed was irradiated for three days with xenon light (85000 lx) by using a weathermeter (Atlas C. I65). The image densities before and after the xenon illumination were measured by using a reflection densitometer (X-Rite 310TR), and the retention rate of the dye was evaluated. The reflection density was measured at the three points of 1, 1.5 and 2.0.

When all of the densities had a dye retention rate of 70% or higher, a mark of A was given. When one or two points had a dye residual rate of less than 70%, the evaluation B was given. When the dye retention rate was less than 70% at all of the densities, the mark of C was given.

TABLE 1

| No. | Absorption of Water Dispersion | | Color Tone | Dependency on Paper | Water-Resistance | Light-Resistance |
|---|---|---|---|---|---|---|
| | $\lambda$max (nm) | $A^{-100}$ | | | | |
| Example 1 | 625 | 0.15 | A | A | A | A |
| Example 2 | 623 | 0.13 | A | A | A | A |
| Example 3 | 632 | 0.15 | A | A | A | A |
| Example 4 | 635 | 0.14 | A | A | A | A |
| Comp. Ex. 1 | 645 | 0.36 | B | B | A | B |
| Comp. Ex. 2 | 672 | 0.25 | A | B | C | B |

$A^{-100}$: light absorbancy at $\lambda$max − 100 nm

As can be seen from Table 1, the inks for an ink jet of the present invention have excellent coloring forming property and color tone, are not dependent on the paper type, and have excellent water-resistance and light-resistance.

The present invention provides a coloring composition which overcomes the previously-described drawbacks of the conventional art, and which has excellent dispersion stability of the coloring particulates, excellent color forming property and color tone (especially cyan color reproduction) when printed onto any arbitrarily selected paper without being dependent on the paper type, and excellent water resistance and light-resistance, and is suitable for use in a water based ink for writing, a water based printing ink, an ink for information recording, and the like. The present invention also provides an ink for an ink jet which is suitable for thermal, piezoelectric, electric field or acoustic ink jet methods, which does not result in clogging of the nozzle tip when characters or the like are printed by using the nozzle, which has excellent color forming property and color tone (especially cyan color reproduction) when printed onto an arbitrarily selected paper without being dependent on the paper type, and which has excellent water resistance and light resistance. The present invention also provides an ink jet recording method.

What is claimed is:
1. An ink for an ink jet comprising:
a coloring composition containing coloring particulates dispersed in a water-based medium, the coloring particulates containing an oil-soluble vinyl polymer having ionic groups in an amount of from 0.1 to 3.0 mmol/g and an oil-soluble dye represented by at least one of following formulae (I), (II), (III), (IV), wherein the oil-soluble vinyl polymer and the oil-soluble dye are separate compounds:

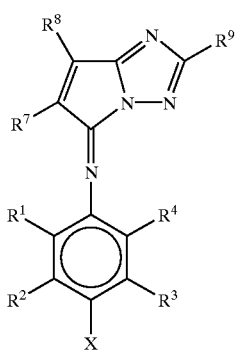

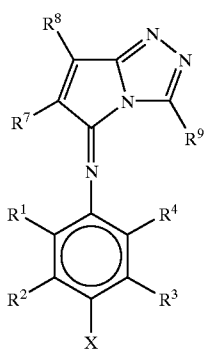

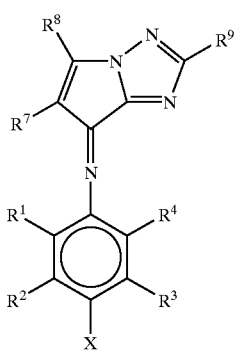

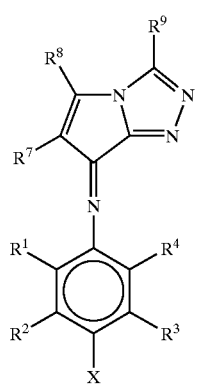

formulae (I) through (IV)

wherein, in formulae (I), (II), (III) and (IV), $R^1$, $R^2$, $R^3$ and $R^4$ each represents a hydrogen atom or a non-metallic atomic group; X represents —OH or $NR^5R^6$; $R^5$ and $R^6$ each represents a hydrogen atom, an alkyl group, an aryl group or a heterocyclic group; $R^7$, $R^8$ and $R^9$ each represents a hydrogen atom or a non-metallic atomic group; at least one of $R^1$ and $R^2$, or $R^2$ and $R^5$, or $R^5$ and $R^6$, or $R^6$ and $R^3$, or $R^3$ and $R^4$ may form a ring structure; and $R^7$ and $R^8$ may bind together to form a ring structure.

2. An ink for an ink jet according to claim 1, wherein the coloring composition has a wavelength of maximum absorption in a wavelength range from 580 to 700 nm, and when absorbance at the wavelength of maximum absorption is regarded as 1, the absorbance is no more than 0.35 at a wavelength 100 nm less than the wavelength of maximum absorption.

3. An ink for an ink jet according to claim 2, wherein $R^7$ in formulae (I), (II), (III) and (IV) represents an acyl group, an acyloxy group, a carbamoyl group, an alkoxycarbonyl group, an aryloxycarbonyl group, a cyano group, a nitro group, an alkylsulfinyl group, an arylsulfinyl group, an alkylsulfonyl group, an arylsulfonyl group, a sulfamoyl group, a halogenated alkyl group, a halogenated alkoxy group, a halogenated aryloxy group or a halogenated alkylthio group each of which has a Hammett substituent constant $\sigma_p$ of 0.30 or more, or an aryl group substituted by two or more electron attracting groups having a $\sigma_p$ of 0.15 or more, or a heterocyclic group.

4. An ink for an ink jet according to claim 2, wherein $R^7$ in formulae (I), (II), (III) and (IV) has a Hammett substituent constant $\sigma_p$ of 0.45 or more.

5. An ink for an ink jet according to claim 2, wherein $R^7$ in formulae (I), (II), (III) and (IV) has a Hammett substituent constant $\sigma_p$ of 0.60 or more.

6. An ink for an ink jet according to claim 2, wherein $R^7$ in formulae (I), (II), (III) and (IV) is a group selected from the group consisting of a cyano group, a nitro group, and a methanesulfonyl group.

7. An ink for an ink jet according to claim 2, wherein a sum of Hammett substituent constants $\sigma_p$ of $R^7$ and $R^8$ in formulae (I), (II), (III) and (IV) is 0.70 or more.

8. An ink for an ink jet according to claim 7, wherein $R^7$ is a group selected from the group consisting of cyano group, alkoxycarbonyl group, alkylsulfonyl group, arylsulfonyl group, and halogenated alkyl groups, and $R^8$ is a group selected from the group consisting of an acyl group, acyloxy group, carbamoyl group, alkoxycarbonyl group, aryloxycarbonyl group, cyano group, alkylsulfonyl group, arylsulfonyl group, sulfamoyl group, and halogenated alkyl groups.

9. An ink for an ink jet according to claim 2, wherein a sum of Hammett substituent constants $\sigma_p$ of $R^7$ and $R^8$ in formulae (I), (II), (III) and (IV) is 0.70 to 2.00, and a Hammett substituent constant $\sigma_p$ of $R^8$ is 0.30 or more.

10. An ink for an ink jet according to claim 2, wherein the oil-soluble dye is represented by formula (I).

11. An ink for an ink jet according to claim 10, wherein $R^1$ in formula (I) represents a hydrogen atom, an alkyl group having from 1 to 10 carbon atoms, an alkoxy group having from 1 to 10 carbon atoms, a halogen atom, an acylamino group having from 1 to 10 carbon atoms, an aminocarbonylamino group having from 1 to 10 carbon atoms, an aminocarbonylamino group having from 1 to 10 carbon atoms; $R^2$, $R^3$ and $R^4$ all represent hydrogen atoms; X represents —$NR^5R^6$, and $R^5$ and $R^6$ each represent an alkyl group having 1 to 10 carbon atoms and which may be substituted; $R^7$ and $R^8$ each represent an electron attracting group whose Hammett substituent constant $\sigma_p$ is 0.30 or more; and $R^9$ represents an alkyl group having from 1 to 20 carbon atoms or an aryl group having from 6 to 20 carbon atoms.

12. An ink for an ink jet according to claim 2, wherein in the coloring particulates, the oil-soluble dye is dispersed in the oil-soluble polymer.

13. An ink for an ink jet according to claim 2, wherein the coloring particulates are obtained by emulsifying and making into fine particles an organic solvent which includes the oil-soluble polymer and the oil-soluble dye, by either adding water to the organic solvent or adding the organic solvent into water.

14. An ink for an ink jet according to claim 1, wherein the vinyl polymer has at least one of carboxyl groups and sulfonic acid groups as ionic groups.

15. A coloring composition comprising:

coloring particulates containing an oil-soluble vinyl polymer having ionic groups in an amount of from 0.1 to 3.0 mmol/g and an oil-soluble dye, the dye being represented by at least one of following formulae (I),(II), (III), (IV), wherein the oil-soluble vinyl polymer and the oil-soluble dye are separate compounds, said coloring particulates being dispersed in a water-based medium:

(I)

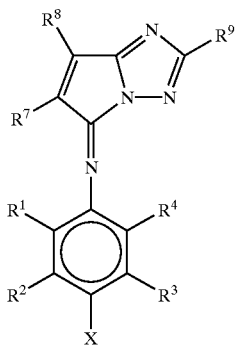

(II)

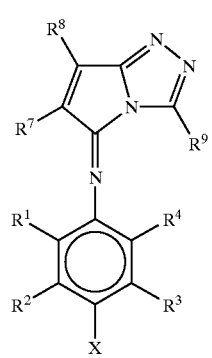

(III)

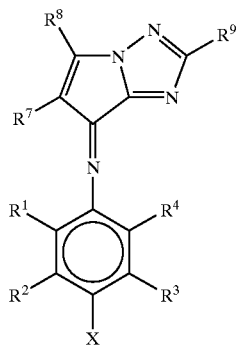

(IV)

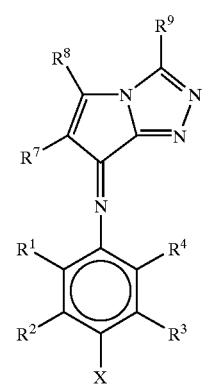

formulae (I) through (IV)

wherein, in formulae (I), (II), (III) and (IV), $R^1$, $R^2$, $R^3$ and $R^4$ each represents a hydrogen atom or a non-metallic atomic group; X represents —OH or $NR^5R^6$; $R^5$ and $R^6$ each represents a hydrogen atom, an alkyl group, an aryl group or a heterocyclic group; $R^7$, $R^8$ and $R^9$ each represents a hydrogen atom or a non-metallic atomic group; at least one of $R^1$ and $R^2$, or $R^2$ and $R^5$, or $R^5$ and $R^6$, or $R^6$ and $R^3$, or $R^3$ and $R^4$ may form a ring structure; and $R^7$ and $R^8$ may bind together to form a ring structure.

16. A coloring composition according to claim 15, wherein the coloring composition has a wavelength of maximum absorption in a wavelength range from 580 to 700 nm, and when absorbance at the wavelength of maximum absorption is regarded as 1, the absorbance is no more than 0.35 at a wavelength 100 nm less than the wavelength of maximum absorption.

17. An ink jet recording method comprising the steps of:

(a) preparing an ink for an ink jet, containing a coloring composition in which coloring particulates, containing an oil-soluble vinyl polymer having ionic groups in an amount of from 0.1 to 3.0 mmol/g and an oil-soluble dye represented by at least one of following formulae (I), (II), (III), (IV), wherein the oil-soluble vinyl polymer and the oil-soluble dye are separate compounds:

(I)
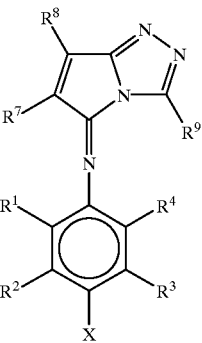

(II)
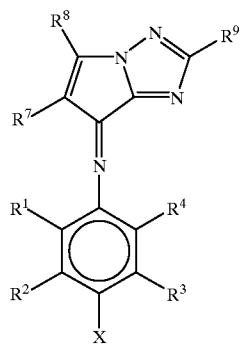

(III)
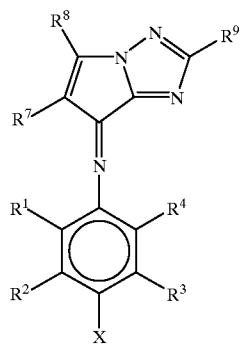

(IV)
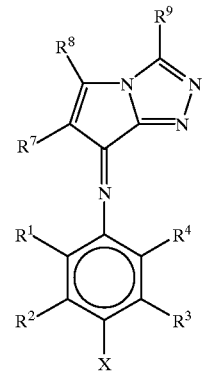

formulae (I) through (IV)

wherein, in formulae (I), (II), (III) and (IV), $R^1$, $R^2$, $R^3$ and $R^4$ each represents a hydrogen atom or a non-metallic atomic group; X represents —OH or $NR^5R^6$; $R^5$ and $R^6$ each represents a hydrogen atom, an alkyl group, an aryl group or a heterocycle group; $R^7$, $R^8$ and $R^9$ each represents a hydrogen atom or a non-metallic atomic group; at least one or $R^1$ and $R^2$, or $R^2$ and $R^5$, or $R^5$ and $R^6$, or $R^6$ and $R^3$, or $R^3$ and $R^4$ may form ring structure; and $R^7$ and $R^8$ may bind together to form a ring structure; and (b) using the ink for recording in an ink-jet printing device.

18. An ink jet recording method according to claim 7, wherein the coloring composition has a wavelength of maximum absorption in a wavelength range from 580 to 700 nm, and when absorbance at the wavelength of maximum absorption is regarded as 1, the absorbance is no more than 0.35 at a wavelength 100 nm less than the wavelength of maximum absorption.

* * * * *